United States Patent [19]

Matsuda et al.

[11] Patent Number: 5,084,833
[45] Date of Patent: Jan. 28, 1992

[54] INPUT SYSTEM FOR USE IN A PORTABLE TYPE DATA PROCESSING DEVICE

[75] Inventors: Eichika Matsuda, Yamatotakada; Kaoru Murata; Yoshihiro Okuda, both of Nara, all of Japan

[73] Assignee: Sharp Kabushiki Kaisha, Osaka, Japan

[21] Appl. No.: 472,448

[22] Filed: Jan. 29, 1990

Related U.S. Application Data

[63] Continuation of Ser. No. 108,210, Oct. 14, 1987, abandoned.

[30] Foreign Application Priority Data

| Oct. 14, 1986 | [JP] | Japan | 61-243702 |
|---|---|---|---|
| Oct. 14, 1986 | [JP] | Japan | 61-243703 |
| Oct. 14, 1986 | [JP] | Japan | 61-243704 |
| Oct. 14, 1986 | [JP] | Japan | 61-243705 |
| Oct. 14, 1986 | [JP] | Japan | 61-243706 |
| Oct. 14, 1986 | [JP] | Japan | 61-243707 |
| Oct. 14, 1986 | [JP] | Japan | 61-243708 |
| Oct. 14, 1986 | [JP] | Japan | 61-243709 |
| Oct. 14, 1986 | [JP] | Japan | 61-243710 |
| Oct. 14, 1986 | [JP] | Japan | 61-243711 |
| Oct. 14, 1986 | [JP] | Japan | 61-243712 |
| Oct. 14, 1986 | [JP] | Japan | 61-243713 |
| Oct. 21, 1986 | [JP] | Japan | 61-251477 |

[51] Int. Cl.$^5$ .............................................. G06F 15/30
[52] U.S. Cl. .................................................. 364/709.04
[58] Field of Search ............... 364/709.04, 709.05, 364/709.01, 709.02, 709.12, 709.15, 709.16, 705.06

[56] References Cited

U.S. PATENT DOCUMENTS

| 4,117,542 | 9/1978 | Klausner et al. | 364/900 |
|---|---|---|---|
| 4,279,022 | 7/1981 | Abe | 364/705.06 |
| 4,402,056 | 8/1983 | Sado et al. | 364/709.15 |
| 4,580,235 | 4/1986 | Yanagawa | 364/709.05 |

FOREIGN PATENT DOCUMENTS

| 0205020 | 12/1986 | European Pat. Off. . | |
|---|---|---|---|
| 3406067 | 8/1985 | Fed. Rep. of Germany . | |
| 2568396 | 7/1985 | France . | |
| 56-40958 | 4/1981 | Japan | 364/705.06 |
| 1539448 | 1/1979 | United Kingdom | 364/709.05 |
| 2147769 | 5/1985 | United Kingdom . | |

OTHER PUBLICATIONS

Patent Abstracts of Japan, vol. 5, No. 201 (P-94) [873], 19th Dec. 1981; & JP-A-56 123 049 (Shigeaki Mitsukake) 26-09-1981.

Patent Abstracts of Japan, vol. 5, No. 154 (P-82) [826], 29th Dec. 1981; & JP-A-56 87 133 (Canon K. K.) 15-07-1981.

Computer Design, vol. 13, No. 7, Jul. 1974, p. 22; "Hand-Held Terminal has Full ASCII Keyboard, 1000-Char Memory".

Computer, vol. 7, No. 7, Jul. 1974, p. 55; "Termiflex Introduces Hand-Held Interactive Terminal with Full ASCII Keyboard and 1,000 Character Scrolling Memory".

Primary Examiner—Gary V. Harkcom
Assistant Examiner—Long T. Nguyen

[57] ABSTRACT

In a data processing device of the handy type having a central processing unit (CPU) arranged to include a calculating mode for performing calculation and a memorandum pad mode for storing data and for reading the stored data in response to the operation of a reading key, the CPU can be changed to the memorandum pad mode by a operation of a reading key so that reading of the data of the memorandum is started with easy operation.

14 Claims, 21 Drawing Sheets

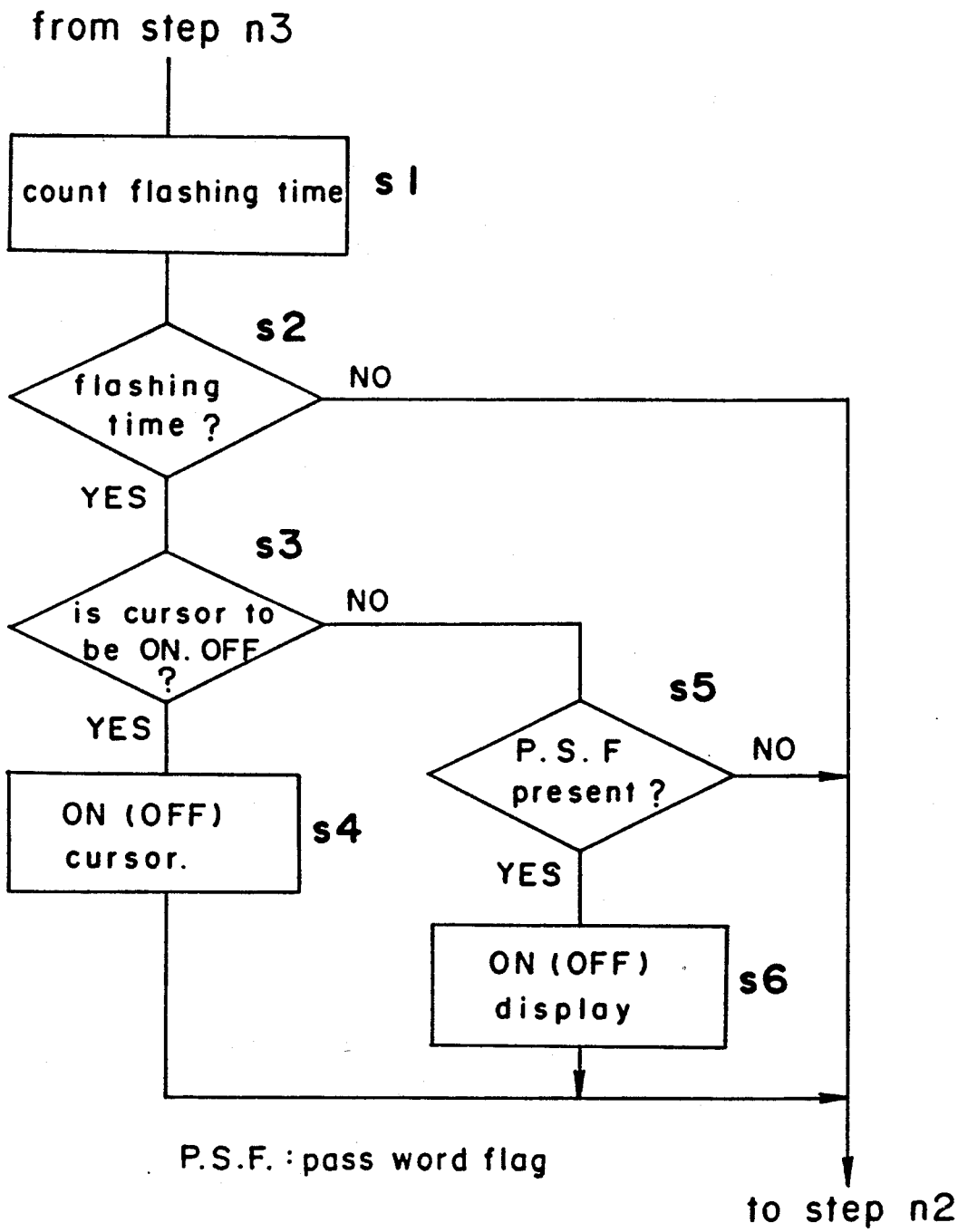

C.P  cursor position
D.P.: decimal point

FI : figure

N.C.: numeric character

Fig. 15

(1) [A] NAME?

(1) [A] SHAR (2) [A] SHAR_

(3) [A] SHARP

D.K.: depressed key

INPUT SYSTEM FOR USE IN A PORTABLE TYPE DATA PROCESSING DEVICE

This application is a continuation of application Ser. No. 07/108,210 filed on Oct. 14, 1987, now abandoned.

BACKGROUND OF THE INVENTION

1. Field of the Invention

The present invention relates to a data reading system for use in a portable data processing device such as electronic memorandum pad which is provided with an function of data processing function and reading and writing the data.

2. Description of the Prior Art

A handy data processing device such as so called an electronic memorandum pad usually includes a calculation mode for processing various data entered thereto, and a memorandum mode for registering the data in the electronic memorandum pad; and a reading function for retrieving the data therefrom. When reading the data, a mode change key is operated so as to change from the calculation mode to the memorandum mode then a reading key is operated so as to read the data.

However, as apparent from the foregoing, in the prior art, it is necessary to operate the mode changing key to change from the operation mode to the memorandum mode before reading the stored data. Such operation is troublesome.

Moreover, in the prior art of the data processing devices of the above type, the decimal point is adapted to be displayed in one figure of a plurality of display elements which are aligned in a right and left direction. Since any one of the display elements is exclusively used for the decimal point, a number of available figures for displaying numeric data is decreased.

Moreover, in the prior art, in order to delete the decimal point already displayed on one of the display elements, it is necessary to operate a specific key such as a delete key. This operation has been troublesome to the operator.

Moreover, in the prior art, in order to input alphabet characters, there is provided a specific function key for inputting alphabeted letters one by one each time the specific key is depressed. However this arrangement is troublesome for the operator because the key must be depressed a number of times until a desired character can be inputted.

Moreover, in the prior art, there is provided a alphabet mode for inputting alphabet character and a numeric mode for inputting numeric data. Both modes can be switched from one to the other by operating a mode change key. In this arrangement, in case a numeric character must be inputted subsequent to input of alphabet character, a cursor is positioned at a last position of a character string already inputted. Therefore in order to input a numeric character following to the alphabet character string, it is necessary to move the cursor by one figure position by a cursor move key. Such operation is also troublesome for the operator.

Moreover, in the prior art of the data processing device of the electronic memorandum tab type, there is provided a secret registration mode in which the data can be entered and read out only when a specific mark or password is attached. In this arrangement, under the secret registration mode, only the secret data can be read. That is under the secret registration mode, the normal registration mode can not be read out.

SUMMARY OF THE INVENTION

An object of the present invention is to provide an improved data processing device in which input of the data and reading of the data from the data processing device can be performed with a simple operation.

According to the present invention, there is provided a data processing device which includes
an input having including a reading key and a plurality of numeric keys manually operable for inputting numeric character and alphabets, memories for storing the various data inputted by the input keys, a data processing unit or CPU having a calculating mode for performing calculation and a memorandum pad mode for storing data and for reading the stored data in response to the operation of the reading key, and a control unit for changing from the calculation mode to the memorandum pad mode in response to the operation of the reading key to begin the reading data.

The input unit further may include a decimal point input key and display units having a plurality of display regions. Each display region is formed of a plurality of figures for displaying character string and numeric data strings with decimal point display elements and cursor display elements so that one decimal point can be displayed in response to the operation of the decimal point input key at a position opposite to a position on which the cursor is displayed and between two adjacent Figures. The decimal point can be selectively turned on and off.

For example the decimal point may be turned off when correction of the inputted numeric data.

The display unit may include a first display unit having a plurality of figures each made of dot matrix display elements which are aligned from left to right and a second display unit having a plurality of figures each made of 8 character display elements. The display elements are also aligned from left to right. Both of the display units are controlled in such a manner that when numeric data are displayed in all of the figures of the first display unit, the leftmost figure of the 8 character display element in the second display unit is turned on and off.

One of the display regions may include a 0 display element exclusively displaying 0 and when the first input data is 0, said 0 display element is turned on.

According to the present invention, there is further provided a data processing device having
input keys including a reading key and a plurality of numeric keys manually operable for inputting numeric characters, each of the numeric keys being assigned by a plurality of characters, a data processing unit or CPU having a calculating mode for performing calculations and a memorandum pad mode for storing data and for reading the stored data in response to the operation of the reading key, a control unit for changing from the calculation mode to the memorandum pad mode in response to the operation of the reading key so that reading of the data is started, a further control unit for enabling to input one of the characters assigned to each numeric key in such a manner that each of the assigned characters can be inputted in a predetermined order in response to operation of the key, and display units for displaying the inputted characters in such a manner that when a new characters is consecutively inputted following to an old character which has been inputted and displayed at a predetermined figure position, said one character is displayed adjacent to said old character.

The data processing device may include a key for changing between the numeric data input mode to alphabet character.

According to the present invention there is further provided a data processing device which includes input keys having a reading key and a plurality of numeric keys manually operable for inputting numeric character and alphabets, a data processing unit or CPU having a calculating mode for performing calculations and a memorandum pad mode for storing data and for reading the stored data in response to the operation of said reading key, a control unit for changing from the calculation mode to the memorandum pad mode in response to the operation of said reading key so that reading of the data is started, and display units for displaying character string representing required data with a part of the characters being turned on and off.

The data processing device according to the present invention may be provided with a normal registration mode in which registration and reading of the data is performed without a secret pass word and a secret registration mode in which registration and reading of the data is not allowed without a password, the device is further able to read, in the secret registration mode, the secret registration preferentially and the normal mode registration data can be read after the reading out of the secret data is completed.

The password may be read out following to completion of the read operation of the registered data. The data processing device may be provided with a function of detecting that the content of said memories is full and causing a specific character to be displayed on the display means.

BRIEF EXPLANATION OF THE DRAWINGS

The present invention will become more fully understood from the detailed description given hereinbelow, and the accompanying drawings which are given by way of illustration only, and thus are not limitation of the present invention, and wherein:

FIGS. 10 11, 12, 13, FIGS. 15 and 16, FIG. 20, FIG. 23, FIGS. 26 and 27 and FIGS. 29 and 30 are plan views of the display unit showing various operations.

DETAILED DESCRIPTION OF THE INVENTION

Figure 1:
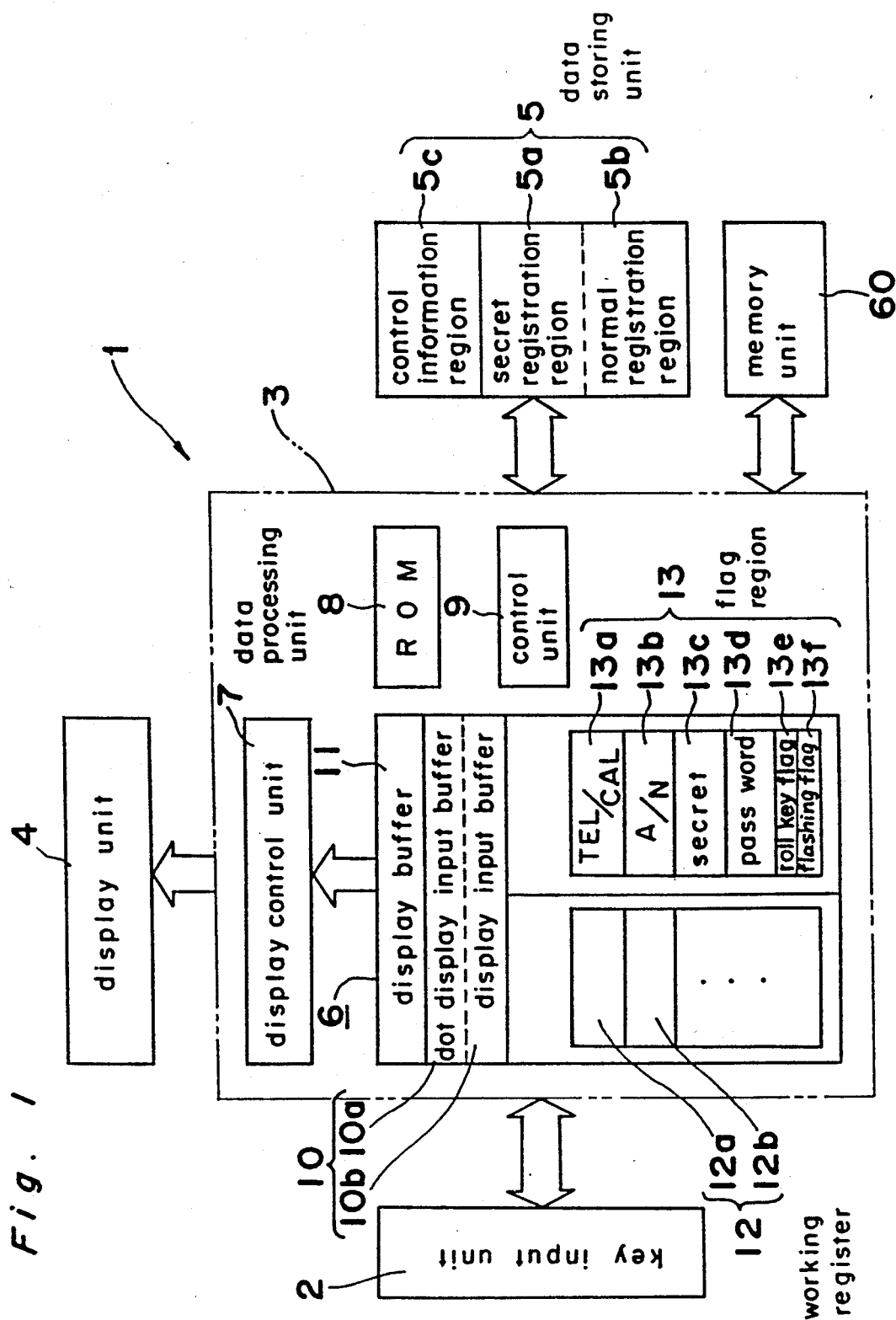
FIG. 1 is a block diagram showing a preferred embodiment of a data processing device according to the present invention.

Referring to FIG. 1, there is shown a handy type data processing device 1 including an electronic memorandum pad capable of storing, reading, and processing various data entered.

The data processing device includes a key input unit 2, data processing unit or CPU 3, a display unit 4 of such as a liquid crystal display device, a data storing unit 5 for storing various data entered through key input unit 2 under the memorandum mode and memory unit 60 for storing data used for performing various calculation.

CPU 3 includes a memory device 6, a display control unit 7 made of one or more decoders for controlling segment and common electrodes of the display unit 4, a ROM (read only memory) 8 for storing various programs such as the system program and a control unit 9 for controlling the memory device 6, includes control unit 7 and ROM 8. The memory device 6 comprises a buffer register 10 for temporarily storing the characters and numerical data entered through the key input unit 2, display buffer 11, working register region 11 and flag region 13. The input buffer 10 further includes an input buffer 10a for storing dot displaying data and a 8 character display data input buffer 10b. The coded signals representing the dot display data and 8 character displaying data entered by the key input unit 2 under memorandum mode are stored temporarily in the input buffer 10 and transferred and stored in the data storing unit 5 when a registering key upon operation of a registering key 26 (see FIG. 2). The coded signals read from the data storing unit 5 can be temporarily stored in the input buffer 10.

The coded signals representing the numerical data under the calculation mode can also be temporarily stored in the input buffer 10. The coded signals stored in the input buffer 10 are transferred and stored in the calculation memory unit 60 when a memory key (not shown) is operated. When the coded signals in the calculation memory unit 60 are read out, the coded signals can be temporarily stored in the input buffer 10.

The coded signals in the input buffer 10 are transferred to the display buffer 11 and stored therein after converted to bit signals corresponding to the characters and numerical characters by a character generator (not shown).

Each of the bit signals stored in the display buffer 11 correspond to a dot or segment of the display unit 4 and when the logic state of each bit of the bit signal is "1", the segment is turned on and when the logic state of the bit "0", the segment is turned off. Each of the bit signal is outputted to the display unit 4 through the display control unit 4.

The working register region 12 includes working registers 12a, 12b...wherein each of the working registers 12a, 12b... are used to store control information such as decimal point control in the 8 character display. The flag regions 13 includes a first flag 13a, second flag 13b, third flag 13c and so on. The logic state "1" of the first flag 13a represents the memorandum mode which is the telephone number mode for storing telephone numbers in the data processing unit 1. The logic state "0" of the first flag 13a represents the calculation mode. The logic state "1" of the second flag 13b represents the alphabet input mode and its "0" state represents numeric character input mode. The logic state "1" of the third flag 13c represents the secret registration mode and its "0" state represents the normal registration mode. The secret registration mode means that inputting and reading the data in and from the data processing device can be made only when a pass word which is secret to others is attached. The logic state "1" of the fourth flag 13d represents that the password is now displayed and its "0" represents that the password is not displayed.

The data storing unit 5 comprises a secret registration region 5a for storing secret data secret, a normal registration region 5b for storing the data in the normal registration mode and a control information region 5c for storing the information for controlling the data stored in the secret registration region 5a and normal registration region 5b.

Figure 2:
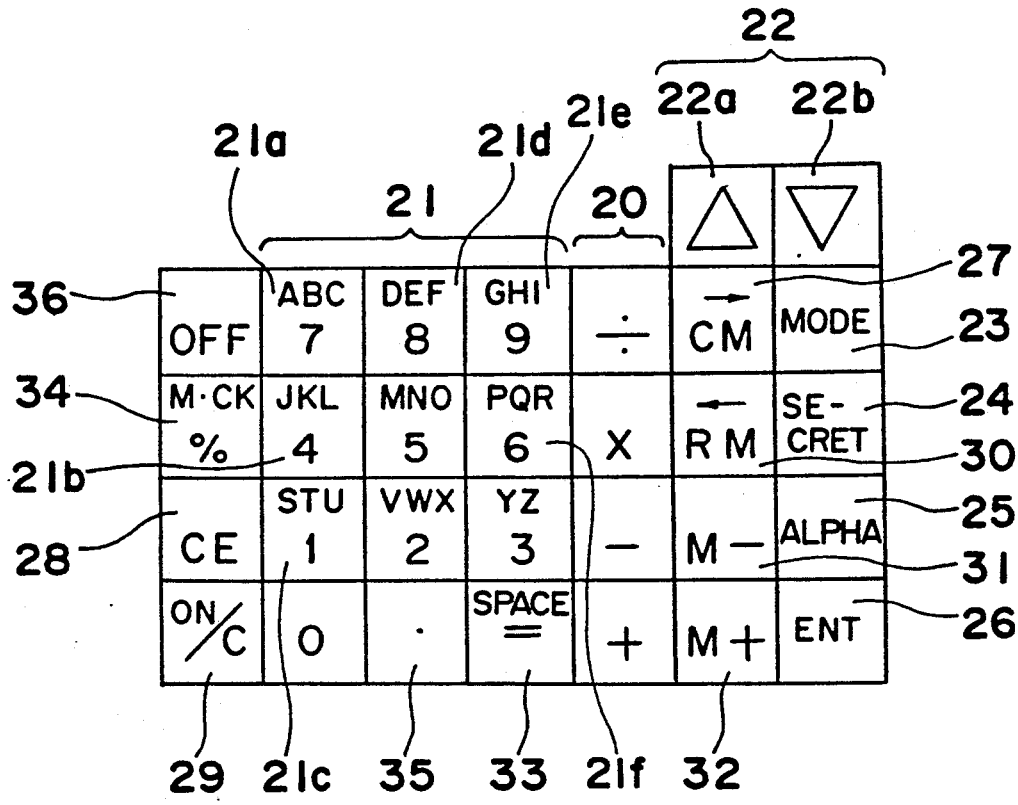
FIG. 2 is a top plan view of a preferred embodiment of a key input unit used in the data processing device shown in FIG. 1.

Referring to FIG. 2, there is shown an arrangement of various keys in the key input unit 2. A set of keys 20 for the calculation of the numerical values including sum, subtraction, multiplication and division. The key input unit 2 further includes alphabets and numeric keys 21, read keys 22 for reading the stored data, a mode switching key 23 for changing between the calculation mode and memorandum mode, a secret registration setting key 24 for setting the secret registration mode, an alphabet mode key 25 for switching between the alphabet input mode and numeric character input mode. The read keys 22 comprises a sequential read 22a and a reversed read key 22b. The sequential read key 22a acts to read the stored data sequentially from the newest data to the oldest data, the latter 22b acts to read the stored data sequentially from the oldest data to the newest data.

There are further provided on the key input unit 2 a clear memory key 27 to clear the memory unit 60 when under the calculation mode, a clear key 28 to clear the data displayed in the display unit 4 and an all clear key 29 to clear the contents of the input buffer 10 and display buffer 11.

There is further provided a recall memory key 30 for accessing the content of the memory unit 60. A memory minus key 31 for subtracting the value displayed in the display unit 4 from the content in the memory unit 60, a memory plus key for adding the value displayed in the display unit 4 to the content in the memory unit 60, equal key 33, present key 34 for performing % display, a decimal point key 35 and a power off key 36.

In order to enter an alphabetic letter, when alphabet key 25 is pressed, and the alphabet mode is set. For example when the key 21a pressed one time, the character "A" can be inputted. When the key 21a is pressed two times, the character "B" can be inputted. When the key 21a is pressed three times, the character "C" can be inputted. When the key 21a is pressed four times, the character "A" reappears inputted. As mentioned above, by depressing the key 21a the characters "A", "B" and "C" can be inputted in a cyclical manner. A similar operation can be performed by depressing the other numeric keys 21. Other keys specifically identified in FIG. 2 are 21b, 21c, 21d, 21e and 21f. Each of these identified keys is similar to key 21a except that these keys identify different numbers and letters.

Operation of the clear memory key 27 acts to move the cursor in a right direction and operation of the recall memory key 30 acts to move the cursor in a left direction. The all clear key 29 can act to turn on the power.

Figure 3:
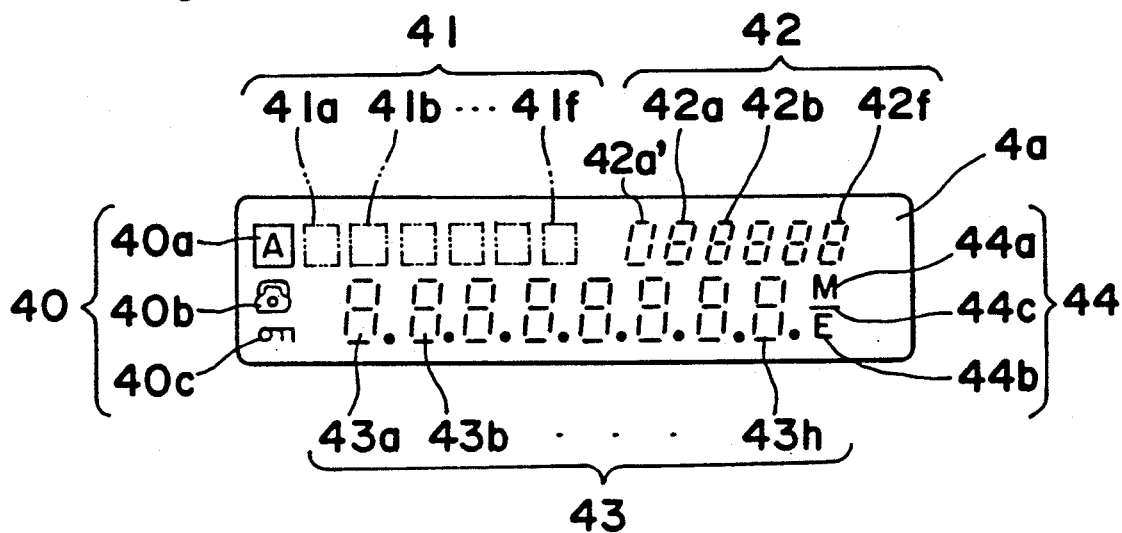
FIG. 3 is a top plan view showing a preferred embodiment of a display unit used in the data processing device shown in FIGS. 4, 5, 6, 7, 8, 9a and 9b, FIG. 14, FIGS. 17, 18, 19, FIGS. 21 and 22, FIGS. 24 and 25 and FIG. 28 are flow charts showing examples of operation of the data processing device according to the present invention, respectively

FIG. 3 shows the contents of the display unit 4. The display panel 4a includes a first mode display region 40, a dot display region 41, a first 8 character display region 42, a second 8 character display region 43 and a second mode display region 44. The first mode display region 40 includes a alphabetic mode display in a telephone mode display 40b, and a secret mode display 40c. The dot display region 41 includes 8 character display elements of six FIGS. 41a to 41f, each of which is composed of 5×5 dots.

The first display unit 42 includes one segment display element 42a for displaying 0 or blank and five figures of 8 character display element 42b to 42f, they do not include a decimal point display. The second display region 43 included eight figures of 8 character display element 43a to 43h with decimal point display. The mode display region 44 includes a memory display 44a, an error display 44b and a minus display 44c.

Figure 4:
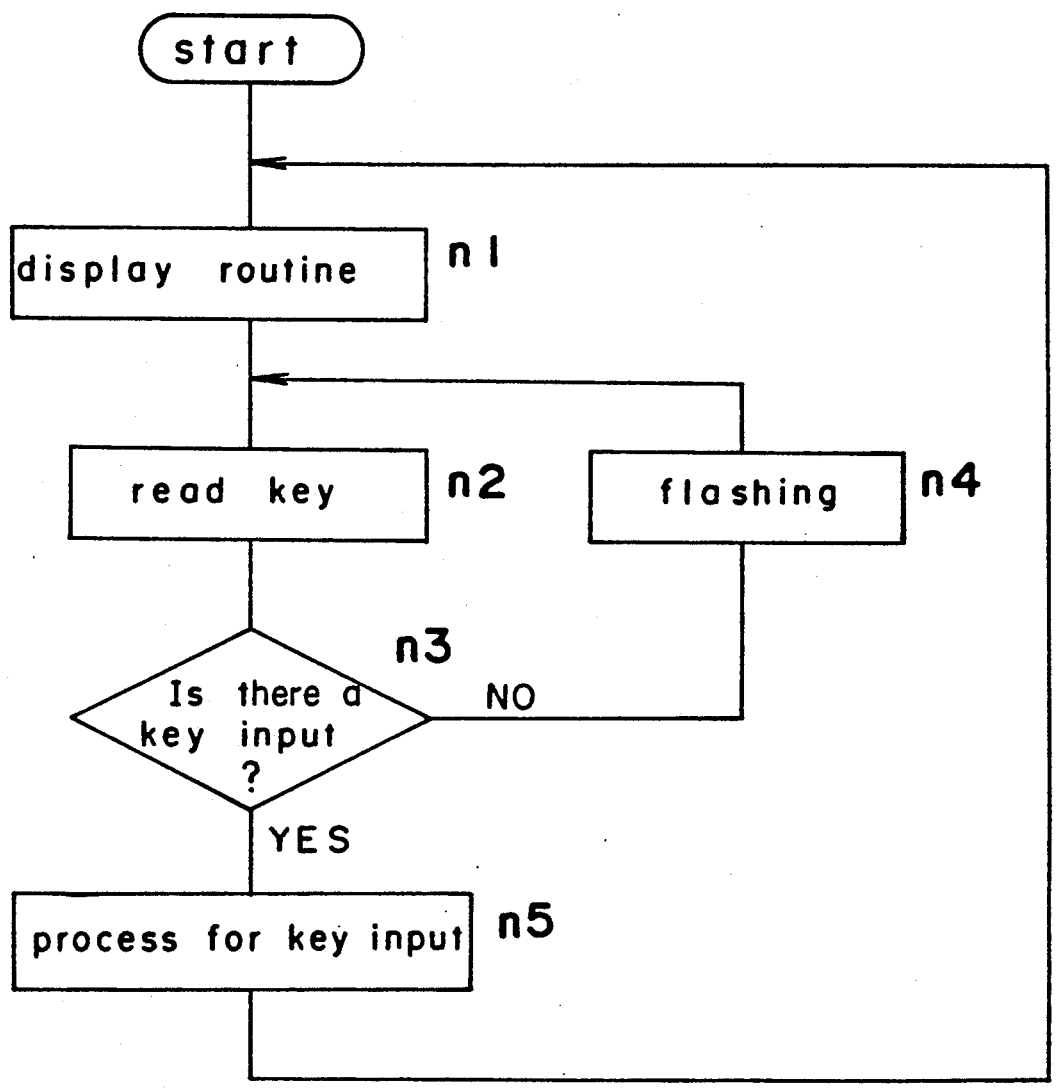

FIG. 4 shows the general operation of the data processing device 1, wherein a display is performed in a display routine n1, a key read in is performed in step n2 and it is judged in step n3 whether or not there is key input. Without key input, a process of turning the display unit on and off of is performed in step n4 and the program returns to step n2. If there is a key input, a process corresponding to the content of the key input is performed in step n5 and the program returns to step n1.

Figure 5:
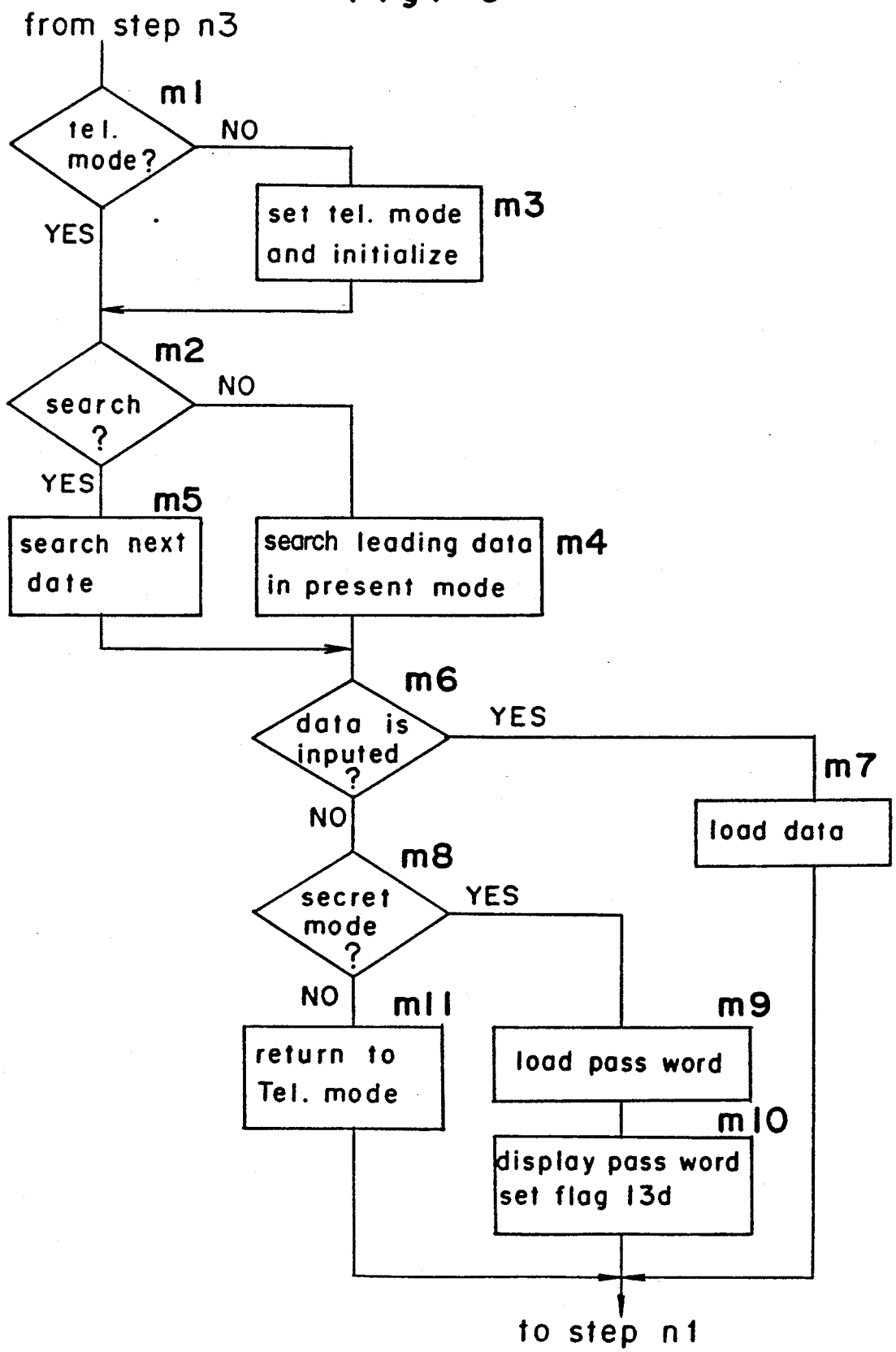

FIG. 5 shows a detailed process of step n5 in FIG. 4 when the read key 22 is operated. When the read key 22 is depressed, the program goes to step m1 from step n3 (FIG. 4) to judge whether or not the telephone mode is set. If the flag 13a is "1" which shows the telephone mode is set, the program goes to step m2 and to judge whether a search condition is set. If the first flag 13a is 0, the judgment is made as to whether the calculation mode is set and the program goes to step m3 so as to change processing device 1 in the telephone mode and initialized then the program goes to step m2. Thus, when the calculation mode is set in the processing device 1, upon operation of the read key 22, the mode is changed into the telephone mode and the search is started. As mentioned above, there is no need to operate the mode change key 23 for changing the mode from the calculation mode to the telephone mode as required in the prior art. Therefore, according to the present invention, the operation can be made simple and the operability can be improved.

Figure 6:
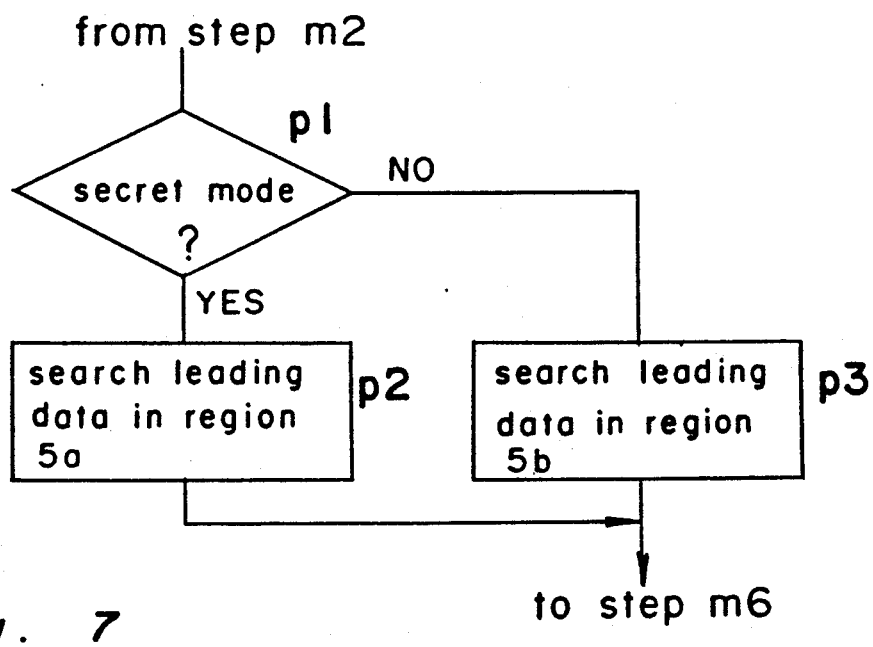

If it is judged in step m2 that the search condition is not set, the program goes to step m4 so that the leading data in the present mode is searched. The specific operation in step m4 is shown in FIG. 6. In step p1, it is judged whether on not the present mode is the secret registration mode. With the logic "1" of the third flag 13c, it is judged that the present mode is the secret registration mode and the program goes to step p2 wherein the leading data stored in the secret registration region 5a is searched and the program goes to step m6 shown in FIG. 5. When the logic of the third flag is "0", it is judged in step p1 whether the normal registration mode is presently set and the program goes to step p3. In step p3, the leading data stored in the normal registration region 5b of the memory unit 5 is searched and the program goes to step m6.

Referring to FIG. 5 again, during if search state is detected in step m2, the next data following the presently searching data is searched. If the sequential read key 22a is depressed, the search is conducted on the data in the order of the registration from the newest following to the presently searched data.

Figure 7:
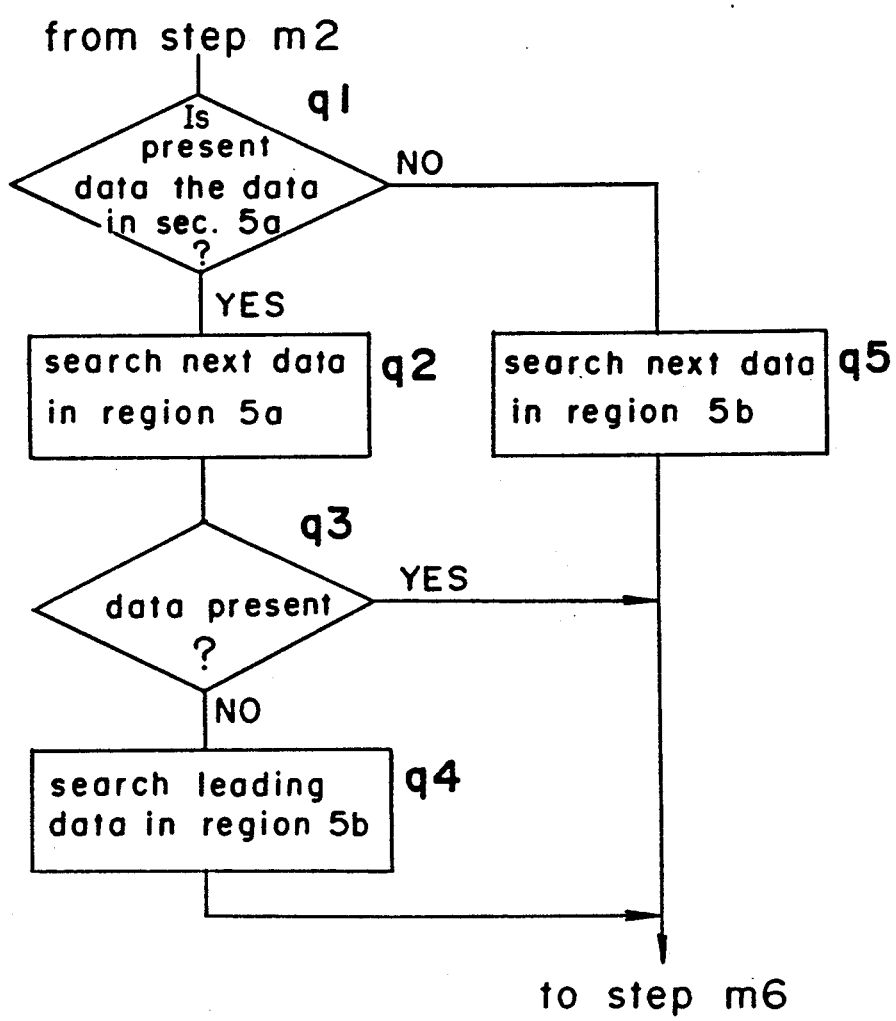

The detailed process of step m5 is shown in FIG. 7.

It is judged in step q1 whether or not the presently searched data is the data stored in the secret registration region 5a of the data memory region 5. If the presently reached data is the data stored in the secret registration region 5a, the program goes to step q2 and the next data stored following the present data in the secret registration region 5a is searched. In step q3, it is judged whether or not the next data exists in the region 5a and if the next data is absent, that is all the data in the secret registration region 5a has been completely read out, the program goes to step q4 wherein the leading data in the normal registration region 5b of the memory unit 5 is searched and the program goes to step m6.

If it is detected in step q1 that the present data is not the data stored in the secret registration region 5a, that is the data is stored in the normal registration region 5b, the program goes to step q5 from q1 and the next data stored in the normal registration region 5b is searched and the program goes to step m6. If data is present in step q3, the program goes to step m6.

Referring to FIG. 5 again, it is judged in step m6 whether or not the data is present. If the data is present, the data is read out in step m7 and the program goes to step n1 of the display routine. The data thus read out is temporarily stored in the key input buffer 11 being outputted to the display unit 4 as the display signal and then the registered data is displayed.

If it is detected that the data is not present, that is all the data stored is read out, the program goes to step m8 to judge whether or not the secret registration mode is set by the state of the third flag 13c. If the third flag 13c is "1", the program goes to step m9 and the password is read out from the control information region 5c of the memory unit 5, being stored in the display buffer 11. Subsequent to the operation mentioned above, the password display flag 13d is set by "1", and the program goes to step n1, whereby the display unit 4 is turned on and off over the period during which the password is displayed.

If the first flag 13c is "0", it is detected that the mode is not the secret registration mode, the program returns to the initial condition of the telephone mode going to step n1.

As mentioned above, if the read key 22 is depressed during the calculation mode, the data processing device is set and the read out operation is executed. If the search is performed in the normal registration mode, the normal registered data stored in the normal registration region 5b are sequentially read out in the order of the registration. If the read key 22 is operated in the secret registration mode, the secret registration data stored in the secret registration region 5a are read out sequentially in the order of the registration and subsequently the normal registration data are sequentially read out after the secret registration data are completely read out and displayed then finally the password is displayed.

Accordingly, in the secret registration mode, all the data including not only the secret registration data but also the normal registration data are read out and displayed automatically. Thus the operator can see all of the registered data on the display unit 4. Since it is possible to read the secret registration data by priority order, the operation of the data processing device is more convenient.

Since the secret registration mode is available only to those having the password, there is no fear that the password can be seen by others even if the password is displayed in the display unit 4.

FIG. 8 shows the detailed operation of step n4 for turning on and off or flashing the display unit 4.

Upon operation of the read key 22, the registered data is read out and displayed by the display unit 4. Key reading is sequentially performed. If the read key 22 is not operated, the program goes to step s1 from n3. In step s1, a counter (not shown) provided in the control unit 9 counts the period of turning on (referred to as ON period hereinafter) and off (the period of turning on or the period of turning off) of a cursor of the display unit 4.

It is judged in step s2 whether or not the ON period has been lapsed. If the ON period has not yet been lapsed, the program goes to step n2 to read in the key. If the ON period has been lapsed, the program goes to step s3 to judge whether or not there is the cursor to be turned on and off.

If there is no cursor to be on and off, the program goes to step s5 to judge whether or not the password flag 13d is "1". If the password flag is "0", the program goes to step n2.

If the key 22 is not actuated, the program circles the loop so that the registered data is continuously displayed on the display unit 4.

If the key 27 is depressed in order to change the display data while the registered data is displayed on the display unit 4, the cursor appears on the display element 41a of the dot display region 41 of the display unit 4. Under such condition mentioned above, in the turning on and off routine, since there is the cursor to be on and off, the program goes to step s4 from s3 to turn the cursor on and going to step n2. Thus a loop s1→s2→n2→n3 →s1 to s4 →n2 is formed, whereby a character or a numeric character can be turned on and at the cursor position. In order to correct the data, a new character or numeric character is inputted by using any keys 21 so as to update the character already entered. By this operation, the cursor is displaced to the next figure position, being turned on and off. Thus, the registered data can be corrected.

When all of the registered data has been read out, a password is displayed. Since the password display flag 13d is "1", the program goes to step s6, and all password data displayed on the display unit 4 is turned on or off and the program goes to step n2. There is formed a loop s1 to s3 s5→s6→n2 to n3→s1 during display of the password, so that the password is turned on and off on the display unit 4.

Since the password is displayed in the final period of the data read process, the user can easily know and confirm the password.

When the password is displayed, correction of a part of the password can be made in a manner similar to the process of correction of the normal data. Therefore, the operability of correcting the password can be improved.

The operation of entering the numerical data and decimal point information in the device shown in FIG. 1 is explained with reference to FIGS. 9a and 9b to FIG. 13.

As mentioned already, the ten numeric keys 21 [0, 1, 2, ... 9] are respectively assigned by alphabetical characters. In order to input character information or numeric data information by the numeric keys 21, the alphabet mode key 25 is depressed.

When the all clear key 29, which is used as the key for supplying the power to the device 1, is depressed, the device 1 can be started as a calculation machine which is able to calculate the numeric data such as adding, subtraction, multiplication and division.

The numeric keys 21 are set for inputting numeric data of 0 to 9. In order to input alphabetic data, when the alphabet mode key 25 is depressed once, each of the numeric keys 21 becomes available to input the alphabetic data. The method for inputting the alphabetic data has previously been explained.

In order to input the numeric data after the desired alphabet characters are inputted, the alphabet mode key 25 is depressed, so that the numeric keys 21 become available to input the numeric data. When the alphabet mode key 25 is depressed again, the numeric keys 21 become available to input the alphabet character. As mentioned above, the numeric keys 21 are switched between the numeric data input condition and alphabet character input condition.

Figure 12:
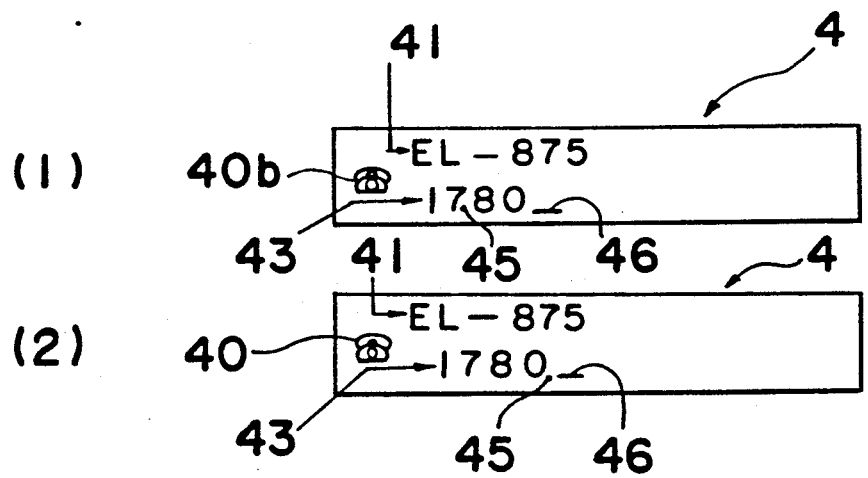

An operation of inputting numeric data and alphabet characters using the numeric keys 21 and alphabet mode key 25 is explained with reference to an example display as shown in FIG. 12 (1) in the dot display region 41 of the display unit 4 followed by an input of the numeric data to the 8 character display region 43.

Figure 9A:
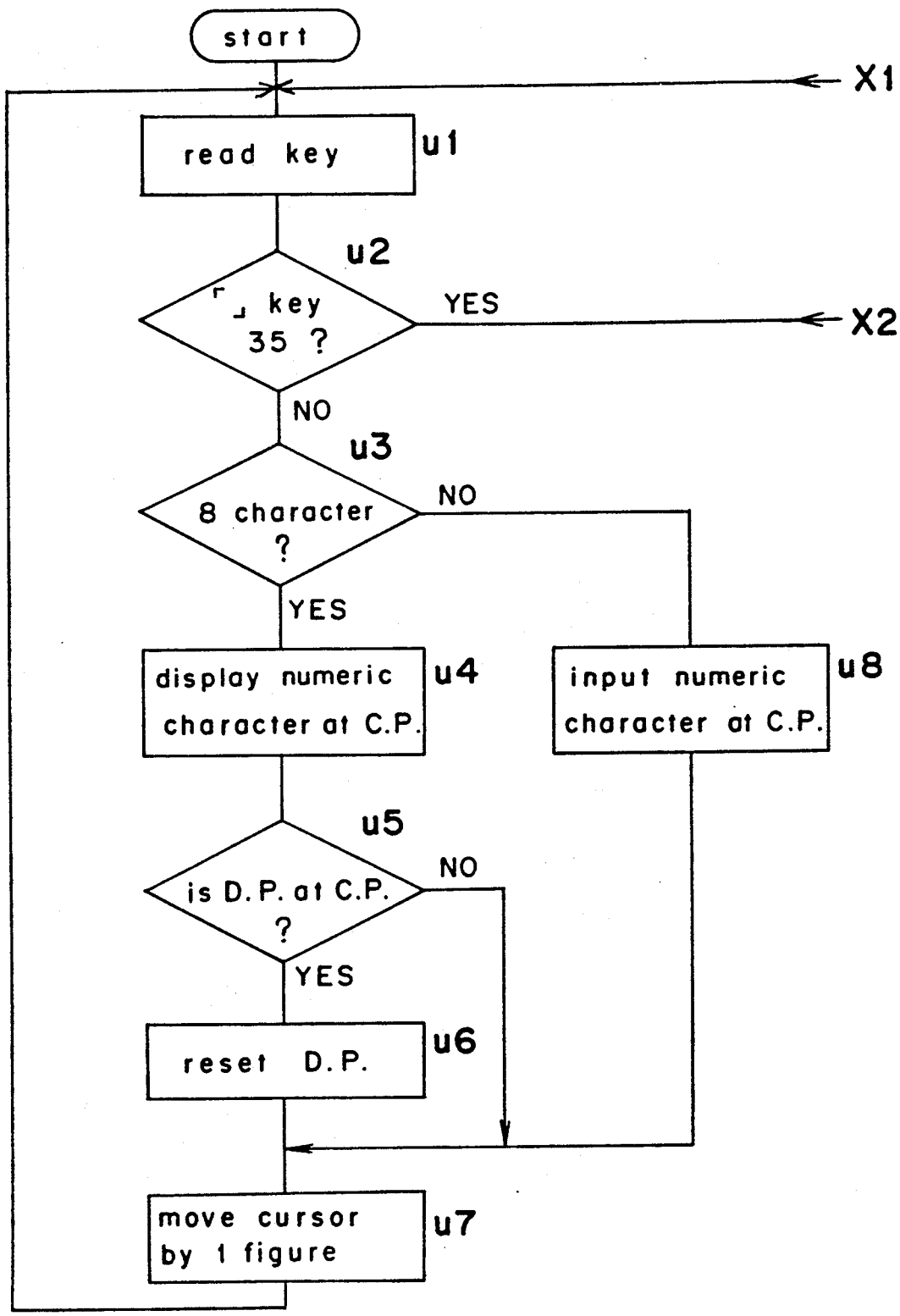
Figure 9B:
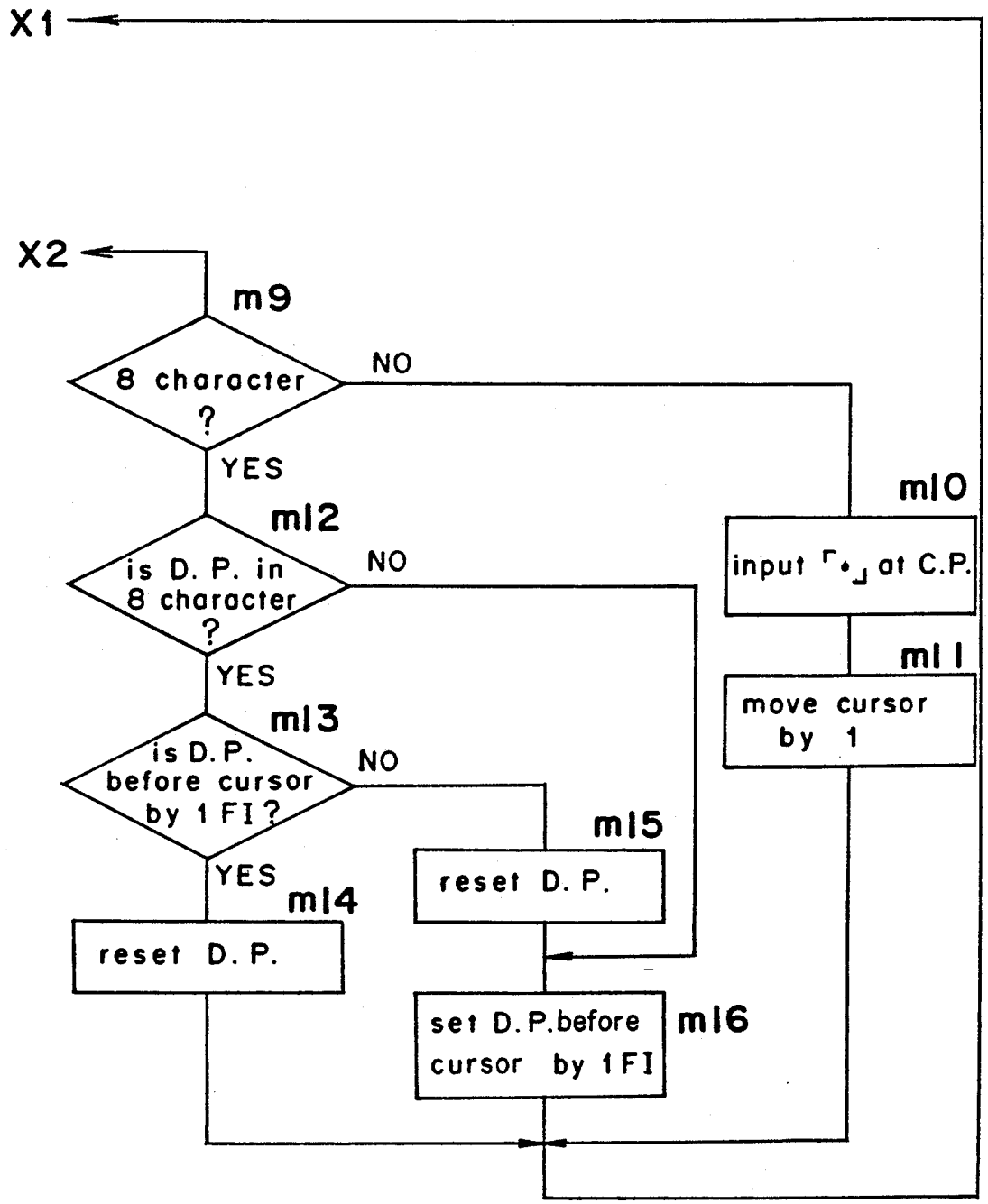

Referring to FIGS. 9a and 9b, when one of the numeric keys such as "1", key 21c, is depressed in step ul, the depression of the "1" key is read by the CPU 3 which judges in step u2 whether or not the operated key is the decimal point key 35. If the decision is "yes", the program goes to step u9, on the other hand, with the decision "no", the program goes to step u3. In this example, the decision is "no". In step u3, CPU 3 judges whether the position on which the numeric character [1] is to be displayed is in the 8 character display region 42 or 8 character display region 43. With the judgment "yes", the program goes to step u4 so that the character [1] is displayed at the position 43a on which the cursor is now displayed (referred to as cursor position hereinafter).

The program goes to step u5 to judge whether or not the decimal point (referred to as D.P. in the flow chart) is displayed on the cursor position. In the example, the cursor is not displayed and the program goes to step u6 to display the cursor 46 in the segment display unit 43b. Thus the display shown in FIG. 10 (1) can be made. Subsequently, by the operation of the numeric key "7" indicated by 21d, the display becomes as shown in FIG. 10 (2) through the operation mentioned above.

In step ul, the decimal point key 35 is depressed. In this example, the judgment in step u2 is "yes" and the program goes to step u3, where it is judged whether the decimal point position to be displayed is in the first 8 character display region 42 or in the second 8 character display region 43. With "no" in the judgment in step u3, this condition represents that the decimal point is displayed in the dot display region 41. Therefore, in step u10, the decimal point is displayed at a position in the dot display region 41 at which the cursor is displayed. In step ull the cursor is moved to right by one figure and the program goes to step ul.

Figure 10:
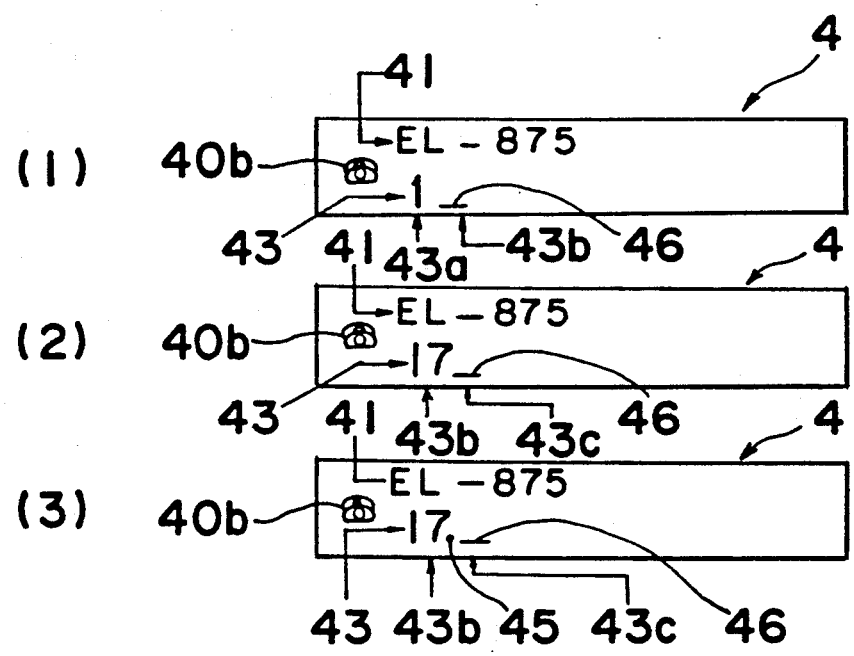

Under such conditions, the display shows the decimal point is going to be inputted following the display condition as shown in FIG. 10 (2), whereby the judgment in step u9 is "yes" and the program goes to step u12. In step u12, it is judged whether or not there is displayed the decimal point in the second 8 character display unit 43. Since the decimal point is not displayed in the 8 character display unit 43 now, the judgment in step u12 is "no" and the program goes to step u16.

In step u16, the decimal point is displayed at the position as shown in FIG. 10 (3). Specifically, the decimal point position in FIG. 10 (3) corresponds to the position between the segment display unit 43c displaying the cursor and the higher figure position 43b of the segment display unit (see FIG. 10 (2)). After this operation, the program goes to step ul.

Subsequently, upon depression of the "7" key 21d, the numeric character 7 is displayed at the cursor position 46 as shown in FIG. 10 (3) with the cursor moved to right by one figure.

Figure 11:
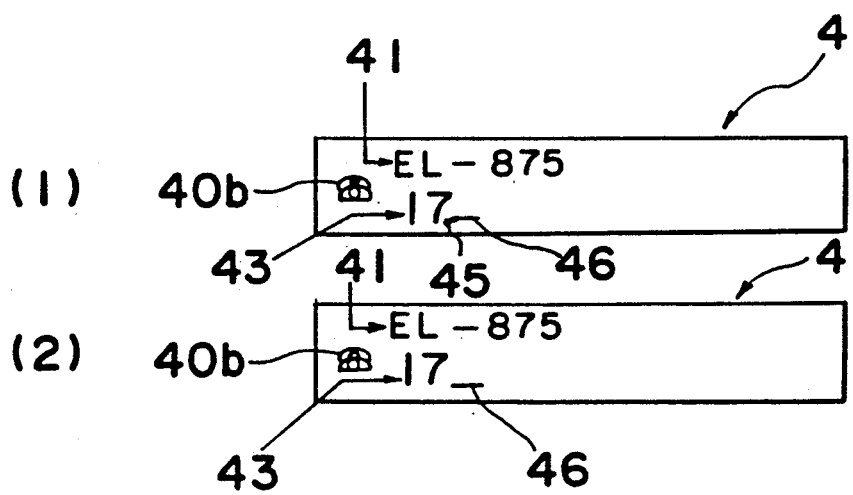

On the display condition mentioned above, the decimal point key 35 is depressed again in step ul. The program goes to step u12 then through u2 and u9. The judgment in step u12 in the present state is "yes" and the program goes to step u13. In step u13, it is judged whether or not the decimal point display position 45 as shown in FIG. 11 (1) is directly before the cursor position 46. In the present state, the judgment is "yes" the program goes to step u14 so that the content of a register 12a which stores the display position of the decimal point 45 as shown in FIG. 11 (1) is deleted to display as shown in FIG. 11 (2). Subsequently the program goes to step ul.

As understood from the foregoing, since the decimal point 45 displayed directly before the cursor 46 can be deleted by only depressing the decimal point key 35, so that the operation of input and delete of the decimal point is easy.

If "8" and "0" keys are depressed following to the state shown in FIG. 10 (3), the display on the display unit 4 becomes as shown in FIG. 12 (1). Under such state, the decimal point key 35 is depressed in step ul, the program goes to step u13 through u2, u9 and u12. The decimal point position 45 in the display unit 4 is separated from the cursor position 46 by two figures, therefore the judgment in step u13 is "no".

Accordingly, the program goes to step u15 so as to delete the data which is stored in the register 12a and represents the display position of the decimal point 45 as shown in FIG. 12 (1), thus the decimal point 45 is turned off in the display unit 4. In step u16, the position of the decimal point is designated at a position between the cursor position 46 and the position on which the numeric character "0" is displayed directly before the cursor position (see FIG. 12 (1)). Then the decimal point 45 is newly displayed as shown in FIG. 12 (2) and the program goes to step ul.

In order to change the decimal point position already displayed to a new position to which a new data is being inputted with respect to the numeric data, it is enough to depress the decimal point key 35 at the new position, whereby it is possible to omit an operation of moving the cursor and deletion of the old decimal point. Accordingly, the operation becomes simple. Since the number of the decimal point position to be stored in the register 12a is only one, thus it is possible to decrease the required memory capacity of the data processing device 1.

It is assumed that the state of the data input to the data processing device 1 is as shown in FIG. 10 (3) in which the first 8 character display region 43 is displaying a character string "17." followed by the cursor 46. Under such a data input state, the way of changing the numeric character "7" to "8" according to the present invention is explained hereinafter.

In the state mentioned above, the cursor 46 is positioned as shown in FIG. 10 (3). Therefore, the cursor is moved to the position on which the numeric character "7" is displayed using any of the cursor move keys 27 and 30. Since the cursor 46 and the character 7 are both displayed at the same figure position, the cursor is not displayed but the character 7 is turned on and off or flashed so as to indicating the character to be changed. Upon depression of the "8" key 21a and the judgment in step u2 is "no" and the judgment in step u3 is "yes". Then the character "8" is displayed in place of "7" in step u4. It is judged in step u5 whether the position of the character "7" is directly decimal point 45. If the judgment in step u5 is "no", this judgment of "no" means that there is a correction of the character "1" (indicated by the reference numeral 43), the display of the character "1" which is flashing in place of displaying with the cursor is changed to the new input character 8 which also flashes and in turn the cursor is moved right by one figure.

Figure 13:
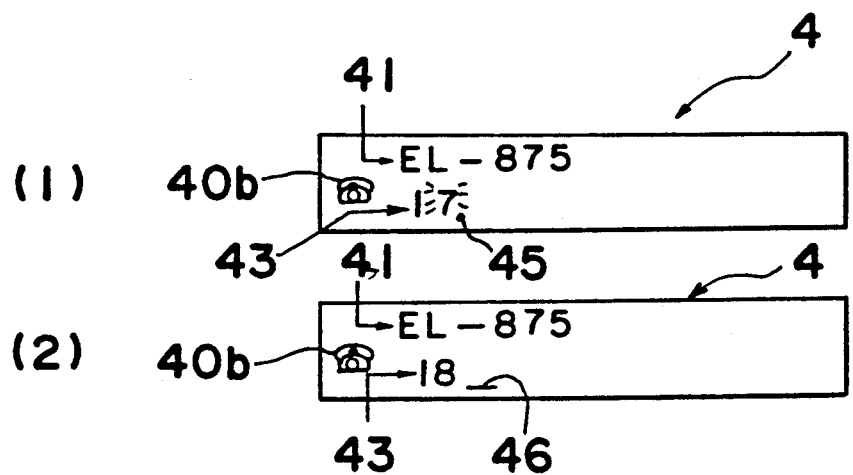

In step u5, if the judgment is "yes and the data of the decimal point position in the register 12a is deleted and the decimal point 45 in the display unit 4 is turned off. Subsequently, in step u7, the cursor 46 is displaced right by one figure from the position on which the character is displayed and the cursor 46 is displayed as shown in FIG. 13 (2).

As mentioned above, if the data displayed directly before the decimal point is changed, the decimal point 45 is also deleted. Therefore, if the numeric data just before the decimal point is corrected, the decimal point is deleted. That is, if an integer is input following a numeric character to be corrected, the operation is made simple, because there is no need a further operation to delete the decimal point, improving the operability of the system.

An example of inputting various alphabet characters using the numeric keys 21 is explained hereinafter.

Figure 14:
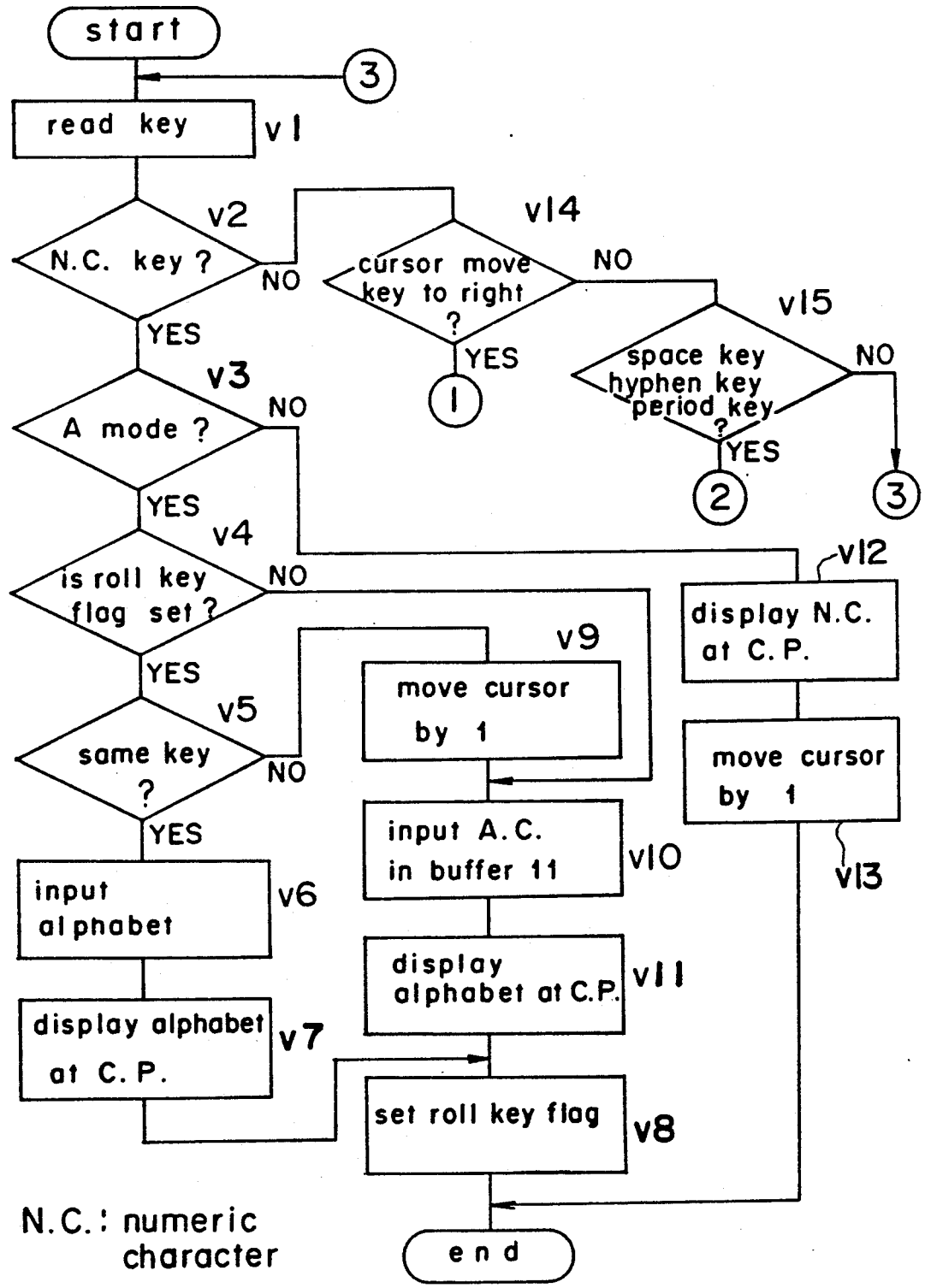

Referring to FIGS. 14 and 15, when the telephone mode is set by the mode changing key 23, a prompt "NAME?" is displayed in the dot display region 41 of the display unit 4.

In step vl, the key information is read in and it is judged in step v2 whether the depressed key is one of the numeric keys 21. If the depressed key is one of the numeric keys 21, the program goes to step v3 and if the depressed key is a key other than the numeric keys 21, the program goes to step v14.

In step v3, it is judged whether or not the numeric keys 21 are set for inputting the alphabet character (referred to as the A mode hereinafter). If the A mode is set, the program goes to step v4. If the A mode is not set, that is the numeric keys 21 are set to input the numeric data (referred to as N mode), the program goes to step v12.

In the A mode, depression of any one of the numeric keys 21 causes the flag 13e in the flag region 13 to be set to "1", while in the N mode, depression of any key causes the flag 13e to be set to "0" for example. The condition of the logic 0 of the flag 13e is referred to as reset condition. The flag 13e is referred to as roll key flag.

It is judged in step v4 whether or not the roll key flag 13e is set to 1. With 1 of the roll key flag, the program goes to step v5 and with 0 of the roll key flag 13e, the program goes to step v10. It is noted that the set condition of the roll key flag 13e shows a fact that a key already depressed just before the present operation of a key is any one of the numeric keys 21 under A mode. Alternatively the reset condition of the roll key flag 13e shows a fact that a key already depressed just before the present operation of a key is any one of the keys other than the numeric keys 21 under N mode or A mode.

It is assumed that a key 21e in the numeric keys 21 is depressed and the roll key flag 13e has been in the reset condition just before the operation of the key 21c. In this case the program goes to step v10.

Under such a condition, in step v10, a coded signal representing the alphabet character S which is the leftmost character depicted on the top face of the "1" numeric key 21c can be inputted in the input buffer 10 in the CPU 3 and transferred to the display buffer 11 and the character S is displayed on the display unit 4 as shown in FIG. 15 (2).

Since the numeric key 21c has been depressed under A mode, the roll key flag 13e is set in step v8.

In the condition discussed above, if the numeric key 21e is depressed, the program goes to step v4 through vl,v2 and v3. Since the roll key flag 13e is set by the operation of the numeric key 21c under A mode, the program goes to step v5, wherein it is judged whether or not the present depressed key and the last depressed key are the same key. If of the same, key the program goes to step v6 and in case a different key is detected, the program goes to step v9.

In step v9, the cursor is shifted right by one figure and a coded signal of the character G assigned to the numeric key 21e is inputted in the display buffer 11 in step v10. In turn, the character G is displayed in the display unit 4 in step vll (see FIG. 15 (3)). Subsequently the program goes to step v8 to perform the operations already explained and the program goes to step vl.

If the key 21e is depressed once again, the program goes to step v5 through steps vl, v2, v3 and v4. In step v5, it is detected that the same key 21e is depressed again and the program goes to step v6, wherein the coded signal of the character H depicted at a position right to the character G on the face of the key 21e is written in the address of the display buffer 11 where the character G was written in the last operation. The character inputted by consecutive operation of the same key can be changed cyclically and sequentially. The inputted character H depicted adjacent to the character G can be displayed in the display unit 4 through the input buffer 11 (see FIG. 15 (4)).

Subsequently, if the alphabet mode key 25 is depressed, A mode is changed to N mode and the alphabet mode display 40a is turned off causing the cursor to be displaced right in one figure.

If the key 21d is depressed, the program goes to step v3 from vl, in which N mode is detected and the program goes to step v12.

In step v12, the coded signal representing the numeric data 7 assigned to the key 21d is inputted in the display buffer 11 to display "7" on the cursor position. In step v13, the cursor is moved right by one figure.

To display the character P at the fifth figure position after R in the fourth figure position, since the characters P and R are assigned to the same key 21f, the cursor must be moved right by operation of the cursor right moving key 27. The operation of moving the cursor is explained hereinafter.

Figure 17:
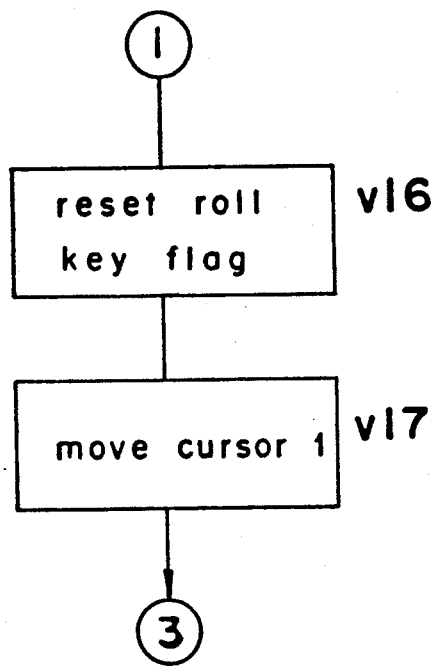
Figure 18:
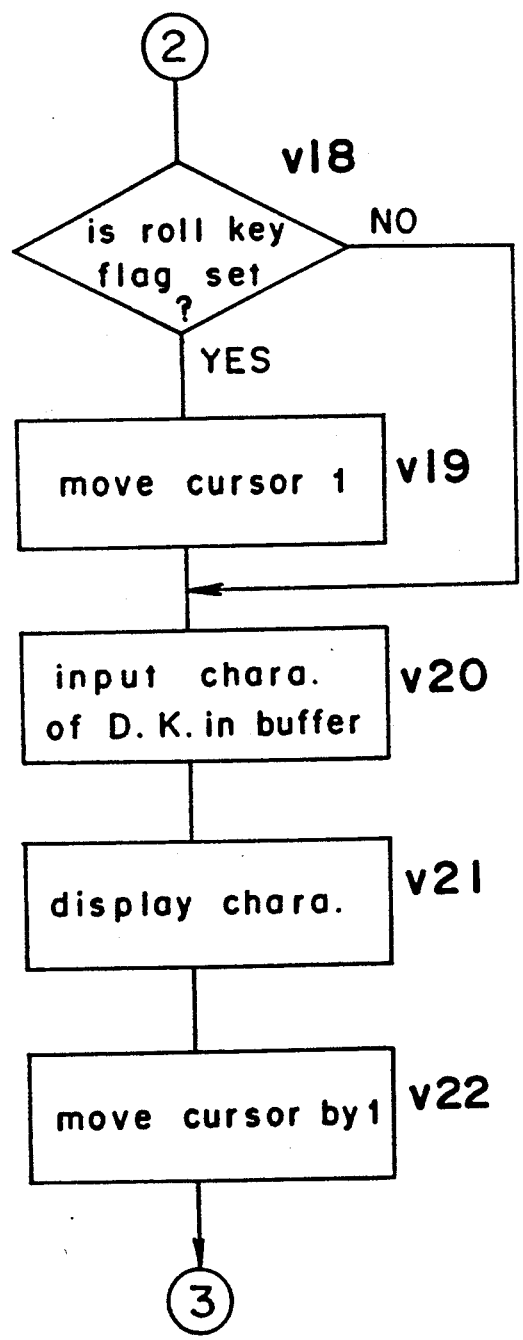

After the key is read in step vl, the program goes to step v2 wherein it is judged whether or not the depressed key is one of the numeric keys 21. In case of depression of the cursor moving key 27, the program goes to the step v14 to detect whether or not the depressed key is the cursor right moving key 27. With yes, the program goes to step v16 (see FIG. 17). With "no", the program goes to step v15.

In step v16, the roll key flag is reset and the cursor is moved right by one figure in step v17. (see FIG. 16(2)).

Subsequently the key 21f is depressed. The program goes to step v3 from v1 via v2. In step v3, since the character "R" has been inputted at the second last operation of the key, it is detected that A mode is continued and the program goes to step v4.

in step v4, since the roll key flag has be reset in step v16, the program goes to step v10 so that the coded signal representing the character "P" which is depicted on the leftmost position on the key 21f is inputted in the display buffer 11, and the character "P" is displayed in step v11. Thus the character strings "SHARP" can be displayed.

Figure 20:
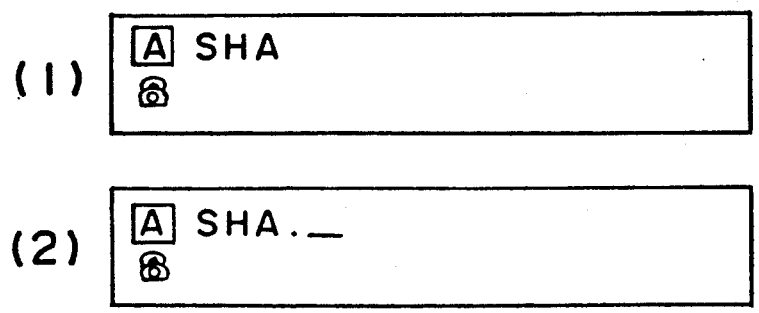

When the decimal point key or period key 35 is depressed, it is assumed that the key 21g is depressed following the display of the character A at the third figure position as shown in FIG. 20 (1).

In step v15, it is judged whether or not the depressed key is any one of the space key 33, hyphen key 36 or decimal point key or period 35. If the depressed key is any one of them, the program goes to step v18, while the depressed key is not any one of them, the program goes to step v1.

In step v18, it is judged whether or not the roll key flag 13e is set. If the flag 13e is set, the program goes to step v19, while the flag 13e is not set, the program goes to step v20.

In the present example, since the character "A" is already displayed before the period key 35 is depressed, it is judged whether the roll key flag 13e is set and the program goes to step v19, wherein the cursor is moved right by one figure position.

In step v20, a coded signal representing the decimal point or period "." is inputted in the display buffer 11 and the period "." is displayed in step v21.

In step v22, the cursor is moved right by one figure position (see FIG. 20 (2)), and the program goes to step v1.

Figure 19:
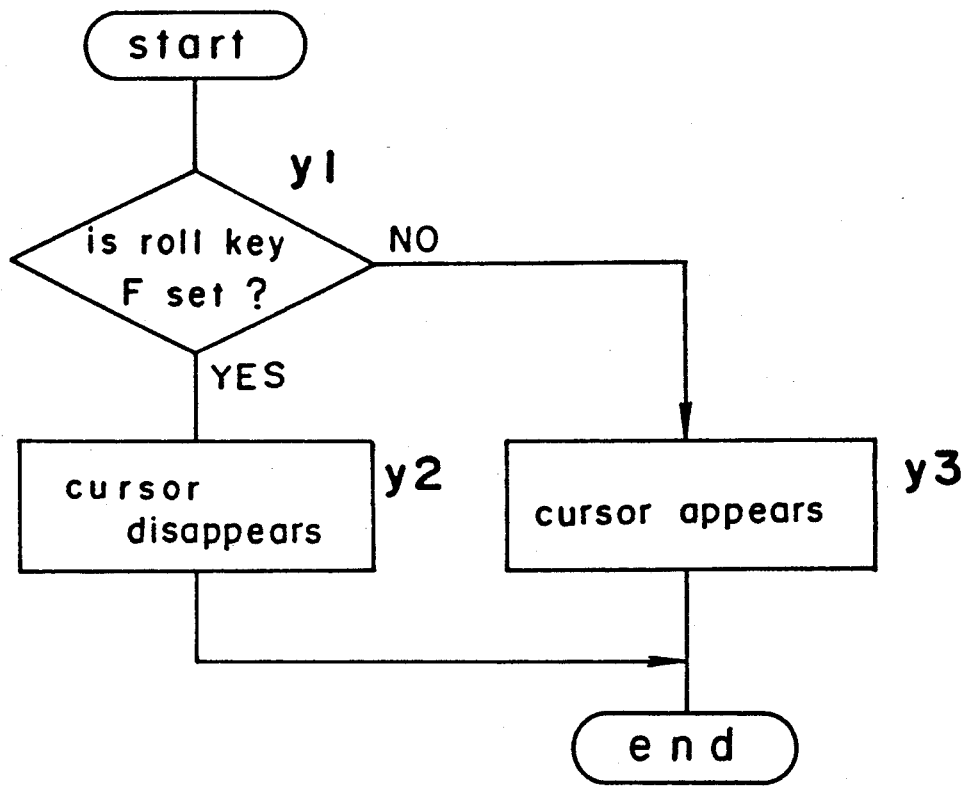

The control for displaying the cursor is explained with reference to FIG. 19.

In step y1, it is judged whether or not the roll key flag 13e for any one of the numeric keys 21 now depressed under A mode is set. If the flag 13e is set, the program goes to step y2 wherein the cursor disappears. While the flag 13e is not set, the program goes to step y3 wherein the cursor appears in the display unit 4.

That is when any one of an alphabetic letter is entered under A mode, the cursor disappears. If not so, the cursor appears in the display unit 4.

Figure 21:
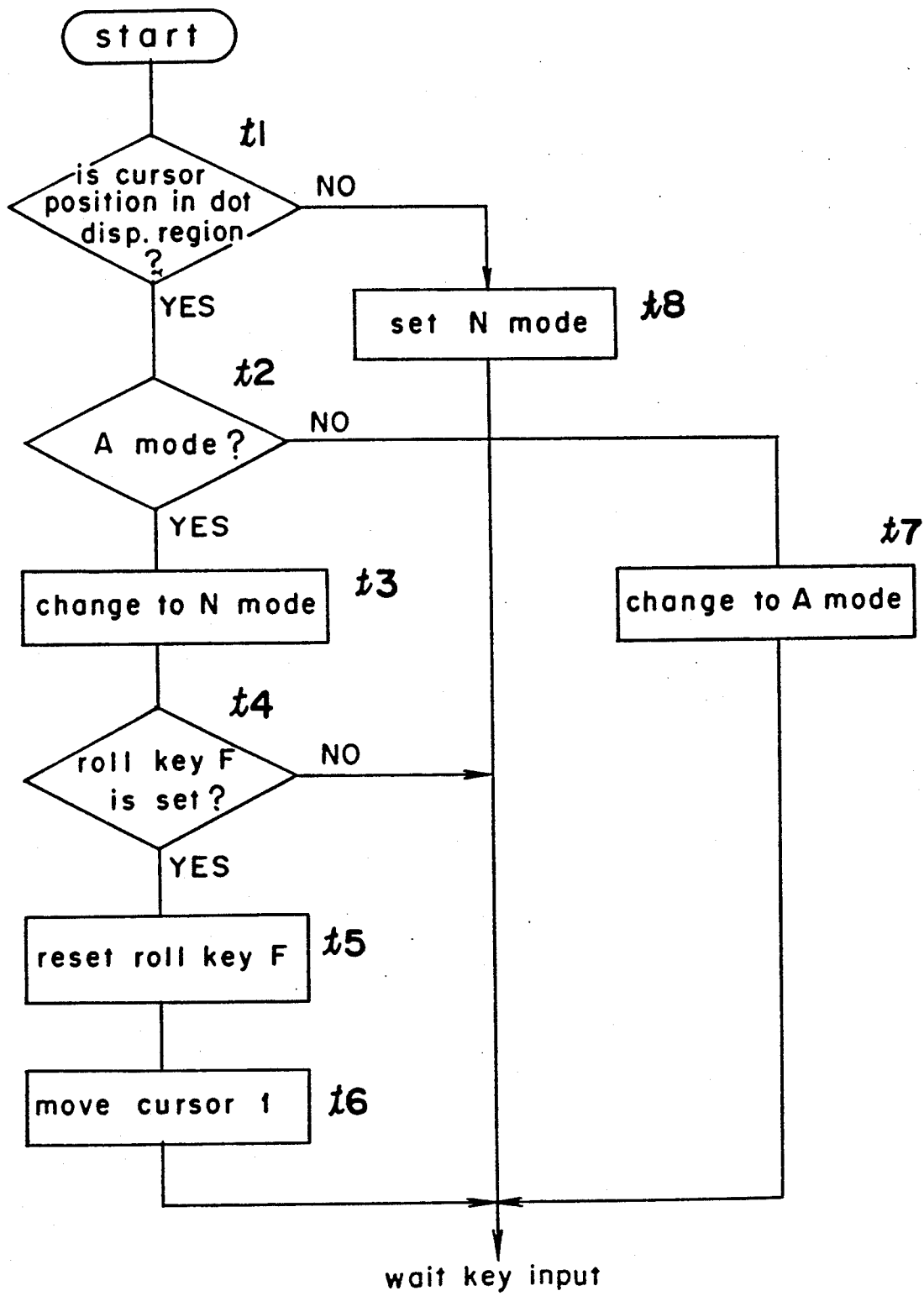

FIG. 21 shows how to switch between the A mode and N mode by operation of the alphabet mode key 25.

In step t1, it is judged whether or not the cursor position is in the dot display region 41 or first and second 8 character display regions 42, 43. In the case of the former, the program goes to step t2, while in case of the latter, goes to step t8.

In step t2, it is judged whether or not the A mode has been set before the alphabet mode key is depressed. With "yes", the mode is changed to N mode in step t3. With "no", the mode is changed to A mode in step t7.

In step t4, it is judged whether or not the roll key flag 13e is set. When the roll key flag 13e has been set, the roll key flag 13e is reset in step t5, thereby causing the cursor to be moved right by one figure position in step t6.

As mentioned above, when the mode is changed from A mode to N mode, the cursor is moved right by one figure position.

If the cursor is in the 8 character regions, N mode is set in step t8.

According to the input system mentioned above, in order to input any one of the alphabet characters, depression of the desired numeric key at most three times enables to enter and display the desired alphabet character. In the A mode, with depression of one of the numeric keys which is different from the previously depressed numeric key causes the cursor to be moved right by one figure position, on which the new character can be displayed. Moreover, the cursor moves even if the mode is changed from the A mode to N mode. Since the cursor is automatically moved, the character input operation can be simplified.

In step N1, it is judged whether or not the coded signal corresponding to any one of the characters assigned to the numeric keys 21 is stored in the display buffer 10a of the input buffer 10. That is, it is judged whether or not the any one of the numeric keys 21 is depressed under A mode or N mode. If none of the input data is stored in the input buffer 10, that is if it is the initial condition, the program goes to step N2. While if it is not the initial condition, the program goes to step N5.

Figure 22:
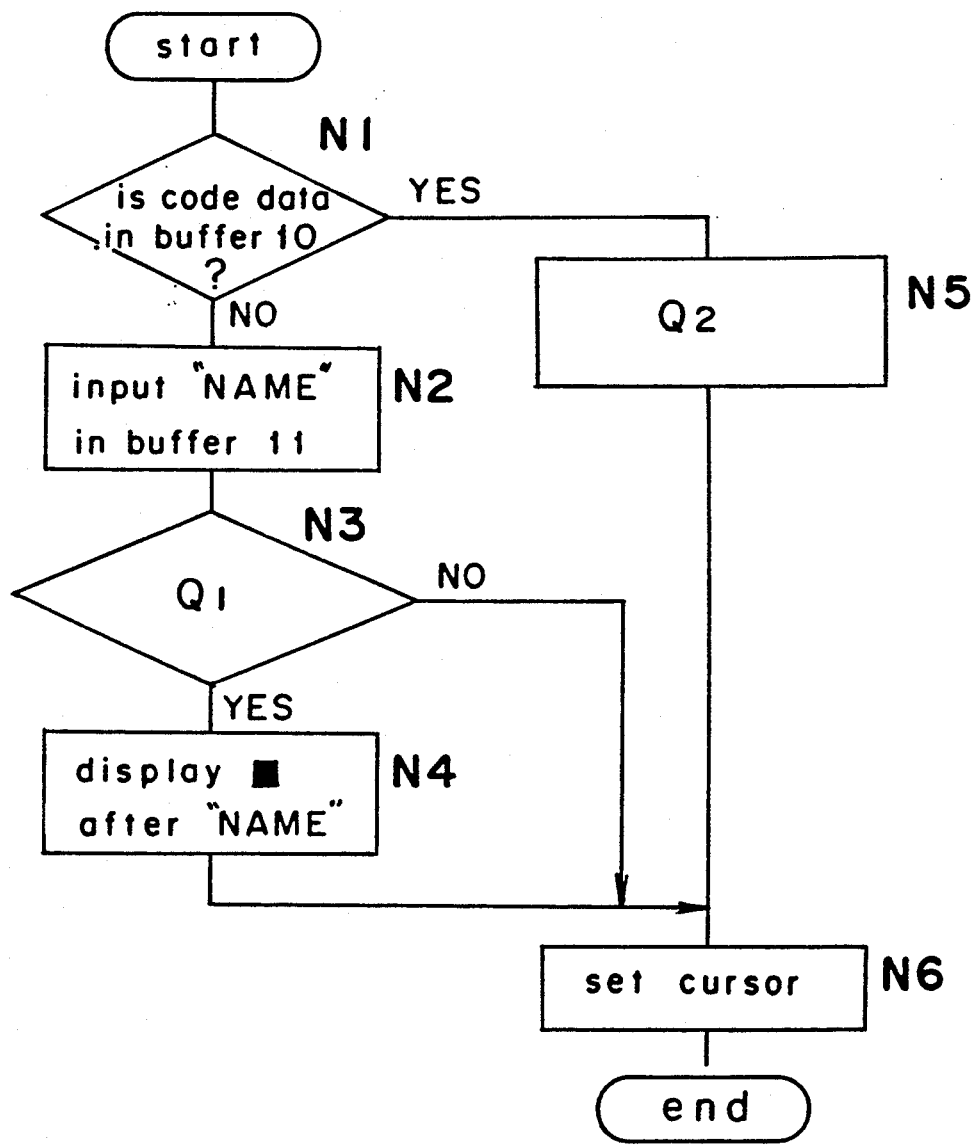

In step N2, the code signal representing the character string of "NAME?" corresponding to the prompt is inputted in the display buffer 11, whereby the prompt "NAMES?" is displayed on the dot display region 41 as shown in FIG. 22 (1).

It is judged in step N3 whether or not the amount of the entered data in the data storing unit 5 reaches its available capacity. If the data can not be stored more in the data storing unit 5, the program goes to step N4. While it is still possible to store the data in the data storing unit, the program goes to step N6.

Figure 23:
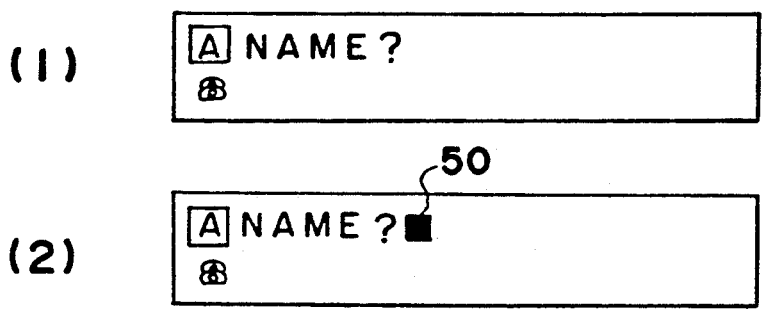

In step N4, a dark square mark 50 is displayed adjacent to the prompt "NAMES?" in the dot display region 41 as shown in FIG. 23 (2). Thus the operator can know that data no longer be entered by the display of the square mark 50.

In step N5, the coded signal thus inputted is stored in the display buffer 11 and displayed on the display unit 4.

In step N6, the cursor is set in the dot display region 41. In this example, the prompt "NAMES?" is continuously displayed until the new character is inputted.

In the process after step N4, new character can not be inputted, however, the data already entered in the device can be read.

Figure 24:
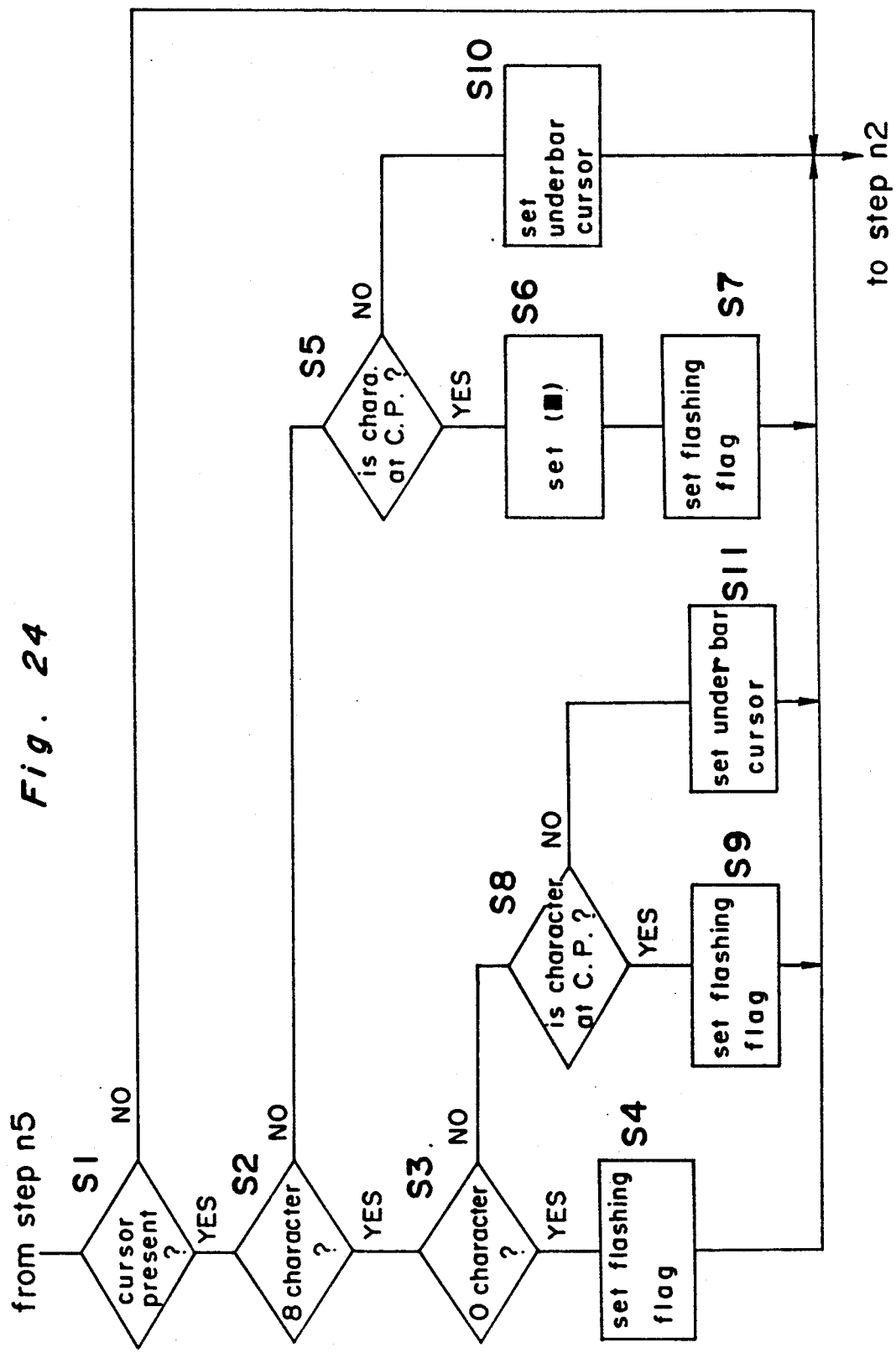

The details of the display routine n1 shown in FIG. 4 is explained with reference to FIG. 24.

It is judged in step S1 whether the cursor is set in the display control unit 7 and if the cursor is not set, the program goes to step n2 to read in the input data. If the cursor is set, the program goes to step S2, wherein the cursor position is in the 8 character display region. In case of "no" in the judgment, the program goes to step S5 on the other hand, in case of "no", the program goes to step S3.

In step S3, it is judged whether or not the cursor position is in the segment display unit 42a. If the judgment is "no", the program goes to step S8. With the judgment "yes", the program goes to step S4 to set the flashing flag 13f as "1" for displaying data on the display unit 42a in a flashing manner.

In step S5, it is judged whether or not a character data is present on the cursor position. In case of "no" of the judgment, the program goes to step S10, while the judgment in step S5 is "yes", the program goes to step S6 to input a coded signal representing the square mark or square cursor in the display of buffer 10a for display the square cursor at a predetermined figure position. The program goes to step S7 so as to display the square cursor and character alternately by setting the flashing flag 13f as "1".

In step S8, it is judged whether or not the character data is inputted on the cursor position in the 8 character display unit other than the segment display unit 42a. If the judgment in step S8 is "no", the program goes to step 11, while if judgment steps 8 is "yes, " the program goes to step S9.

In step S9, the flashing flag 13f is set as 37 1" so as to flash the character displayed on the cursor position.

In step S10, a coded signal representing an under bar cursor is inputted in the display buffer 10a so as to display the underbar cursor which is formed by turning on the bottom row dots of the dot matrix of one figure.

Figure 26:
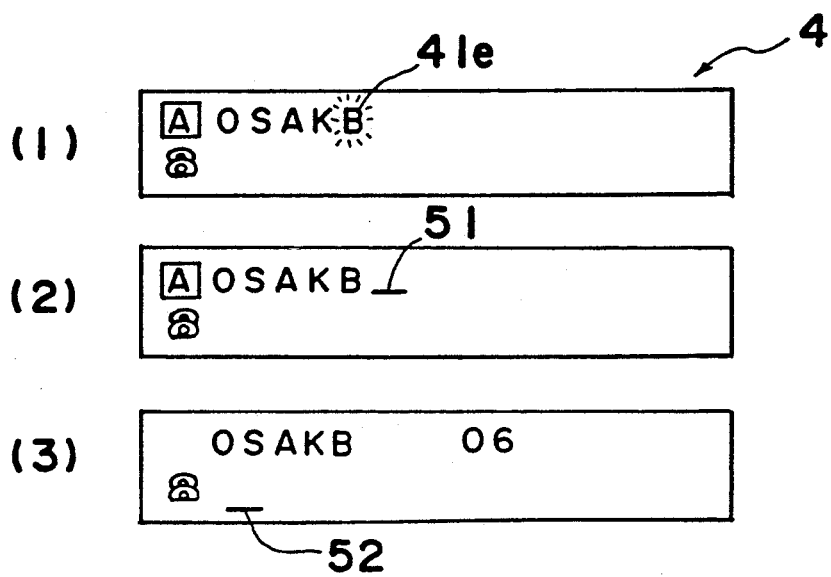
Figure 27:
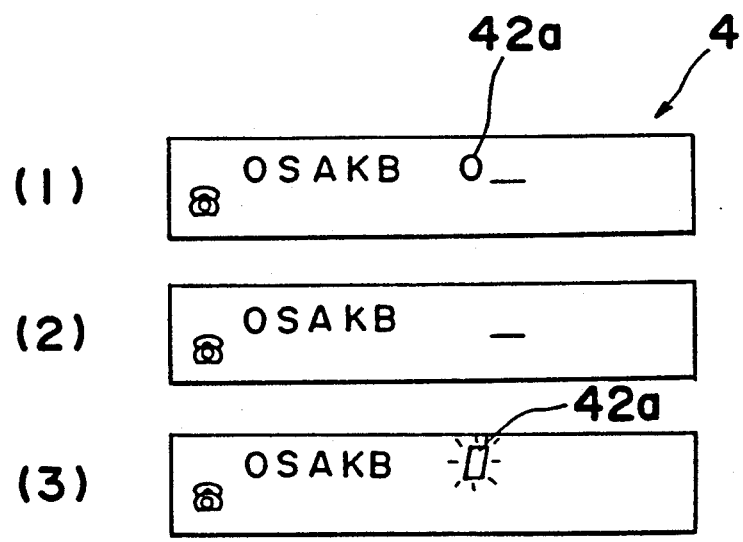

FIG. 26 shows examples of the display in the telephone mode in the dot display region 41 of the display unit 4 and 8 character display region other than the segment display unit 42a. FIG. 26 (2) shows an example of the display of the underbar cursor 51 in step S10. FIG. 27 shows examples of the display in the segment display unit 42a.

In step S11, the coded signal of the underbar cursor in the input buffer 10 when the character is not inputted at the cursor position other than the segment display unit 42a and in turn the program goes to step n2 to read the key. FIG. 26 (3) shows an example of the display of the underbar cursor 52 in step S11.

Figure 25:
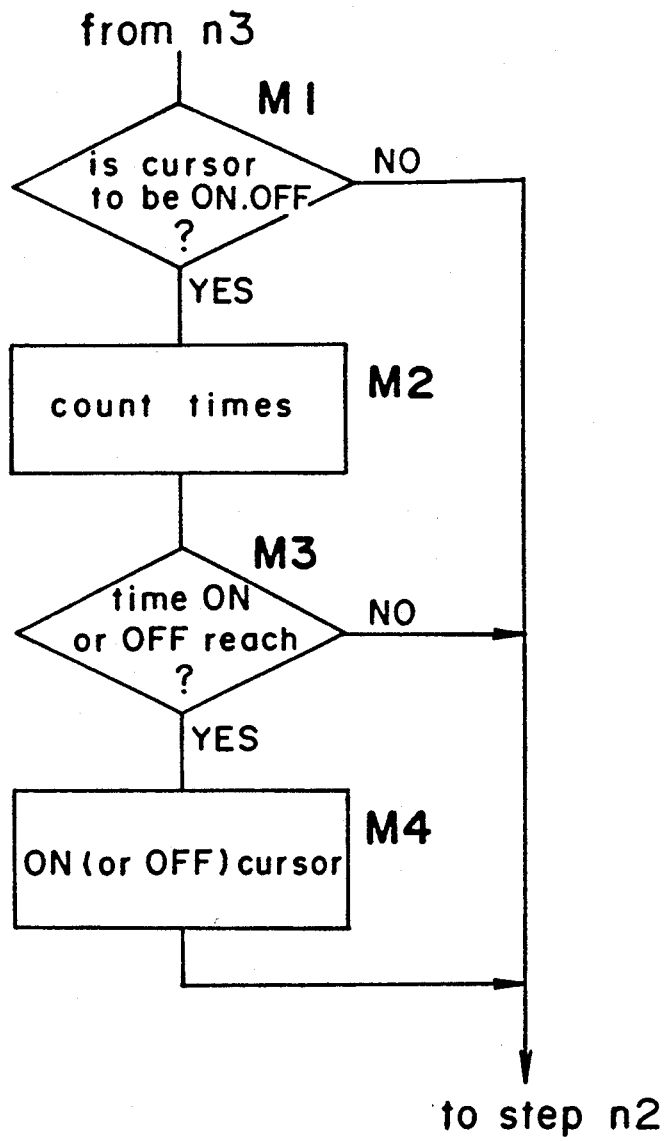

Referring to FIG. 25, in step M1, it is judged whether or not the flashing flag is set to judge whether or not there is the cursor to be flashed and if the judgment in step M1 is no, the program goes to step n2, while the judgment in step M1 is yes, the program goes to step M2.

In step M2, the CPU counts the flashing time, turn on time and turn off time of the data to be displayed. Subsequently, the program goes to step M3 to judge whether each of the turn on time and turn off time has lapsed. If these times have not yet lapsed, the program goes to step n2 while if these times have lapsed, the program goes to step M4. In step M4, the CPU controls the display control unit 7 to turn the character displayed on the cursor position on and off and the program goes to step n2. If no key is operated, the program goes cycles steps n2, n3, and n4 that is steps M1, M2, M3 and M4. By the operation, the character on the cursor position is turned on and off.

Referring to FIG. 26 (1), the character B indicated by 41e is turned on and off or flashed. FIG. 27 (3) shows an example of the flashing operation of the numeric character "0" in the segment display unit 42a, which displays only "". FIG. 27 (1) shows an example of display "0". FIG. 27 (2) shows an example of display of a space.

As mentioned above, in the data processing device according to the present invention, to register a telephone number, for example, in the telephone number mode, when the input operation of the necessary character is completed the cursor moves to the leftmost figure position on the segment display unit 42a and the numeric character "0" is turned on and off. Therefore, the operator can easily notice that the cursor is moved to the 8 character display region 50 from the dot display region 41 and further notices that only the numeric character can be entered in the device.

Figure 28:
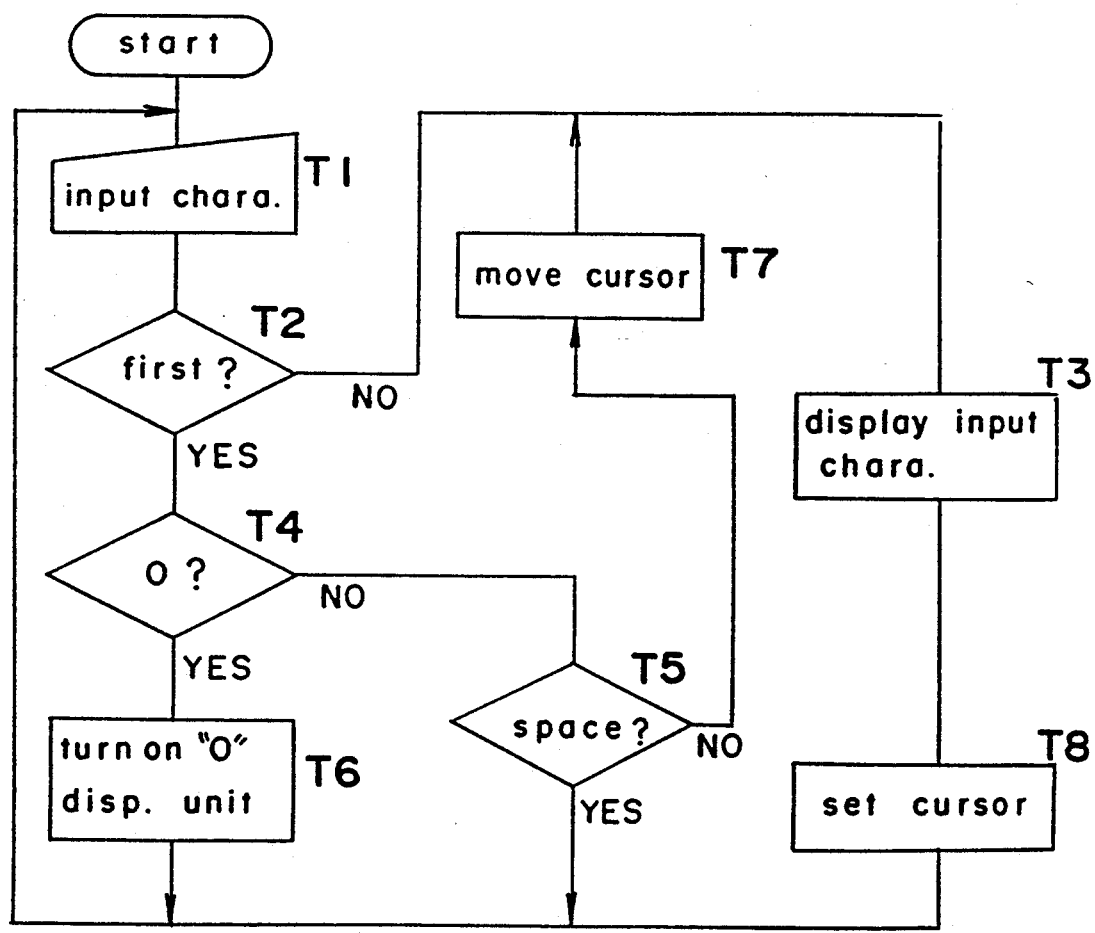
Figure 29:
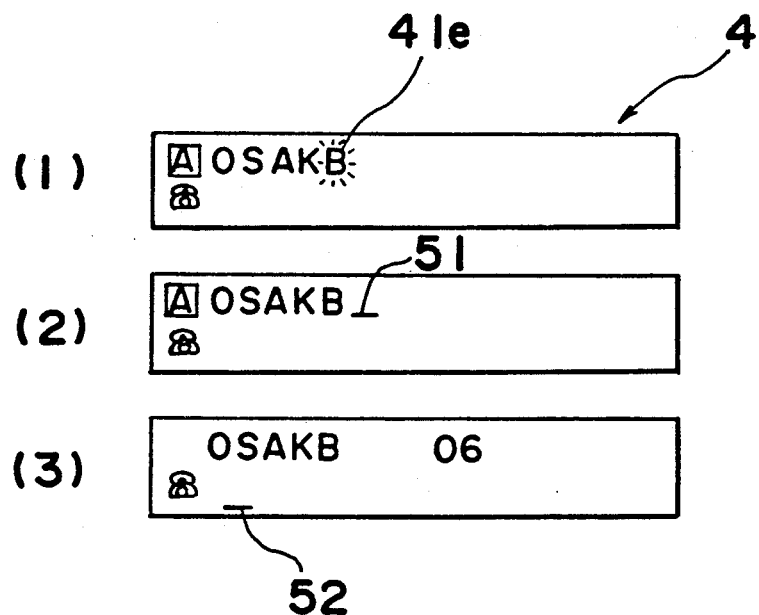
Figure 30:
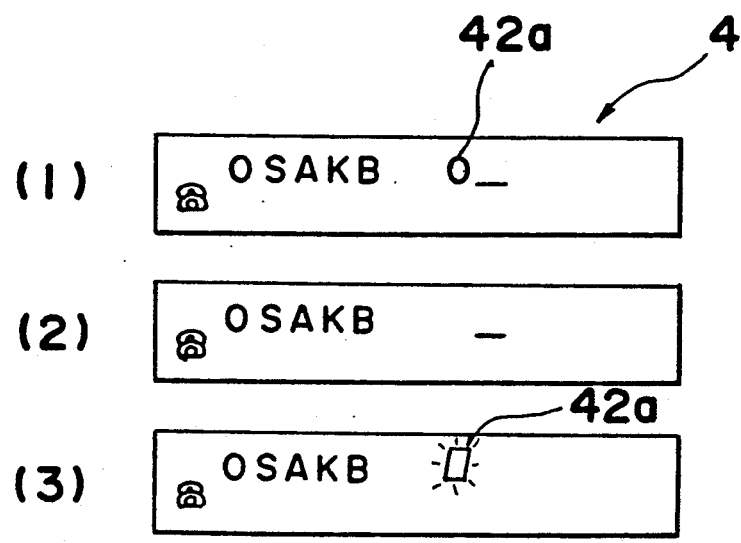

Referring to FIG. 28, when any one of the keys in the key input unit 2 is depressed in step T1, so as to input the character data. Subsequently, it is judged in step T2 whether or not the input data is the data for the first figure position of the 8 character display unit 42. If the judgment in step T2 is "no", the program goes to step T3. On the other hand if the judgment is "yes", the program goes to step T4.

It is judged in step T4 whether or not the input data is "0". If the data is not "0", the program goes to step T5, while the input data is "0", the program goes to step T6. In step T5, it is judged whether or not the input data is a "space". If the input data is not "space", the program goes to step T7, while the input data is "space", the program goes to step T1.

In step T6, the numeric character "0" is displayed on the segment display unit 42a which is exclusively used to display "0" according to the input data. In step T7, the segment display unit 42a is made blank (or space) and the cursor is moved right by one figure position for indicating the data input position. Subsequently the input character data is displayed at the right adjacent segment display unit (in this example the display unit 42b) in step T3. The cursor is set at the next figure position and the program goes to step T1.

What is claimed is:

1. A portable data processing device, comprising:
    input means for inputting numeric and alphabetic data, wherein said input means further comprises a plurality of alphanumeric keys are manually inputting numeric and alphabetic data and decimal point key input means for inputting decimal point data associated with said numeric data;
    a mode key for changing operations of the processing device;
    reading key means, separate from the mode key, for selectively reading out either numerical or alphabetic data;
    memory means for storing said numeric and alphabetic data inputted through said input means;
    data processing means for performing numerical calculations and processing alphabetic data, said data processing means including a calculation mode for performing calculations and memorandum pad mode for storing data in said memory means for reading data stored in said memory means;
    actuation means, separate from the mode key, for selectively changing said data processing means from said calculation mode to said memorandum pad mode upon direct actuation of said reading key means; and
    display means for displaying said alphabetic and numeric data stored in said memory means, wherein said display means further comprises decimal point display means responsive to said decimal point key input means for displaying decimal point data associated with said numeric data.

2. A data processing device according to claim 1, wherein said decimal point display means can be turned on and off.

3. A portable data processing device as recited in claim 1 wherein said input means further comprises correction means for correcting alphabetic and numeric data stored in said memory means and displayed on said display means.

4. A portable data processing device according to claim 3, wherein said decimal point display means is off during actuation of said correction means for correction of said numeric data.

5. A portable data processing device as recited in claim 3, wherein said display means further comprises:
first display means for displaying data in a dot matrix format, wherein said first display means is composed of a plurality of dot matrix display elements; and
second display means for displaying data in an eight character display element format, wherein said second display means is composed of a plurality of eight character display elements.

6. A portable data processing device according to claim 1, wherein said data processing means further having a normal registration mode in which registration and reading of numeric and alphabetic data is performed without entry of a secret password and a secret registration mode in which registration and reading of data is not allowed without entry of a password.

7. A portable data processing device as recited in claim 1, wherein said input means further comprises enablement key means for selectively enabling the input of both numeric and alphabetic data using said alpha numeric keys.

8. The apparatus of claim 1, wherein said input means further include means for inputting the numeric and alphabetic data separately.

9. The apparatus of claim 8 further including means for inputting a plurality of letters by the user of a single alpha-numeric key;

10. The apparatus of claims 9 wherein a single alpha-numeric key can put three continuous alphabet letters;

11. The apparatus of claim 10 including means for inputting different letters dependent upon the number of times a single alpha-numeric key is depressed.

12. The apparatus of claim 1 wherein said reading key means includes a first a second reading key.

13. The apparatus of claim 12 including means for reading stored data from newest to oldest stored data and said means for reading is actuated by the user of the first of said reading keys.

14. The apparatus of claim 12 including means for reading stored data in sequence from oldest to newest stored data and said means for reading is actuated by the use of the second of said reading keys.

* * * * *